(12) United States Patent
Unnikrishnan et al.

(10) Patent No.: US 12,148,169 B2
(45) Date of Patent: Nov. 19, 2024

(54) THREE-DIMENSIONAL TARGET ESTIMATION USING KEYPOINTS

(71) Applicant: QUALCOMM Incorporated, San Diego, CA (US)

(72) Inventors: Jayakrishnan Unnikrishnan, Jersey City, NJ (US); Avdhut Joshi, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 713 days.

(21) Appl. No.: 17/480,016

(22) Filed: Sep. 20, 2021

(65) Prior Publication Data
US 2023/0087261 A1    Mar. 23, 2023

(51) Int. Cl.
*G06T 7/20*  (2017.01)
*G06T 7/73*  (2017.01)
*G06V 10/46*  (2022.01)

(52) U.S. Cl.
CPC ............... *G06T 7/20* (2013.01); *G06T 7/74* (2017.01); *G06V 10/462* (2022.01); *G06T 2207/20224* (2013.01); *G06T 2207/30252* (2013.01)

(58) Field of Classification Search
CPC ... G06T 7/20; G06T 7/74; G06T 2207/20224; G06T 2207/30252; G06T 2207/10016; G06T 2207/30261; G06T 7/70; G06T 7/50; G06V 10/462; G06V 20/647
See application file for complete search history.

(56) References Cited

U.S. PATENT DOCUMENTS 11,816,991 B2 *   11/2023   Stein ..................... G08G 1/165
2009/0005961 A1 *  1/2009   Grabowski ............ G02B 27/01
                                                    701/532

OTHER PUBLICATIONS

Cao, Zhong ("A geometry-driven car-following distance estimation algorithm robust to road slopes" Transportation Research (Year: 2019).*

* cited by examiner

*Primary Examiner* — Molly Wilburn
(74) *Attorney, Agent, or Firm* — Polsinelli/Qualcomm

(57) ABSTRACT

Systems and techniques are described for performing object detection and tracking. For example, a tracking object can obtain an image comprising a target object at least partially in contact with a surface. The tracking object can obtain a plurality of two-dimensional (2D) keypoints based on one or more features associated with one or more portions of the target object in contact with the surface in the image. The tracking object can obtain information associated with a contour of the surface. Based on the plurality of 2D keypoints and the information associated with the contour of the surface, the tracking object can determine a three-dimensional (3D) representation associated with the plurality of 2D keypoints.

30 Claims, 17 Drawing Sheets

Image with GT Boxes 8 x 8 Feature Map 4 x 4 Feature Map loc : $\Delta(cx, cy, w, h)$
conf : $(c_1, c_2, \ldots, c_p)$

THREE-DIMENSIONAL TARGET ESTIMATION USING KEYPOINTS

FIELD OF THE DISCLOSURE

Aspects of the disclosure relate generally to object detection and tracking. In some implementations, examples are described for performing object detection and tracking based on image information.

BACKGROUND OF THE DISCLOSURE

Object detection and tracking can be used to identify an object (e.g., from a digital image or a video frame of a video clip) and track the object over time. Object detection and tracking can be used in different fields, including transportation, video analytics, security systems, robotics, aviation, among many others. In some fields, a tracking object can determine positions (also referred to as locations herein) of other objects (e.g., target objects) in an environment so that the tracking object can accurately navigate through the environment. In order to make accurate motion and trajectory planning decisions, the tracking object may also have the ability to estimate various target object characteristics, such as pose (e.g., including position and orientation) and size.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, methods, apparatuses, and computer-readable media for performing object detection and tracking. According to at least one illustrative example, an apparatus is provided for performing object detection and tracking. The apparatus can include at least one memory, and at least one processor (e.g., configured in circuitry) coupled to the at least one memory. The at least one processor is configured to: obtain an image comprising a target object at least partially in contact with a surface; obtain a plurality of two-dimensional (2D) keypoints based on one or more features associated with one or more portions of the target object in contact with the surface in the image; obtain information associated with a contour of the surface; and determine, based on the plurality of 2D keypoints and the information associated with the contour of the surface, a three-dimensional (3D) representation associated with the plurality of 2D keypoints.

In another illustrative example, a method is provided for performing object detection and tracking. The method includes: obtaining, by a tracking object, an image comprising a target object at least partially in contact with a surface; obtaining, by the tracking object, a plurality of two-dimensional (2D) keypoints based on one or more features associated with one or more portions of the target object in contact with the surface in the image; obtaining, by the tracking object, information associated with a contour of the surface; and determining, by the tracking object based on the plurality of 2D keypoints and the information associated with the contour of the surface, a three-dimensional (3D) representation associated with the plurality of 2D keypoints.

In another illustrative example, a non-transitory computer-readable medium is provided that has stored thereon instructions that, when executed by one or more processors, cause the one or more processors to: obtain an image comprising a target object at least partially in contact with a surface; obtain a plurality of two-dimensional (2D) keypoints based on one or more features associated with one or more portions of the target object in contact with the surface in the image; obtain information associated with a contour of the surface; and determine, based on the plurality of 2D keypoints and the information associated with the contour of the surface, a three-dimensional (3D) representation associated with the plurality of 2D keypoints.

In another illustrative example, an apparatus for performing object detection and tracking is provided including: means for obtaining an image comprising a target object at least partially in contact with a surface; means for obtaining a plurality of two-dimensional (2D) keypoints based on one or more features associated with one or more portions of the target object in contact with the surface in the image; means for obtaining information associated with a contour of the surface; and means for determining, based on the plurality of 2D keypoints and the information associated with the contour of the surface, a three-dimensional (3D) representation associated with the plurality of 2D keypoints.

In some aspects, the target object includes a vehicle and the surface includes a road. In some aspects, the information associated with the contour of the surface includes a plane associated with the road. In some aspects, the plurality of 2D keypoints include contact points between wheels of the vehicle and the road in the image.

In some aspects, a first 2D keypoint of the plurality of 2D keypoints includes a first pixel position in the image, and a second 2D keypoint of the plurality of 2D keypoints includes a second pixel position in the image. In some cases, to determine the 3D representation associated with the plurality of 2D keypoints, the method, apparatuses, and computer-readable medium described above can include determining a 3D line segment joining a first 3D representation of the first 2D keypoint and a second 3D representation of the second 2D keypoint. In some examples, the information associated with the contour of the surface includes a plane associated with the surface and the 3D line segment is constrained to be included in the plane. In some aspects, to determine the 3D line segment, the method, apparatuses, and computer-readable medium described above can include determining estimated parameters of the 3D line segment. In some cases, the estimated parameters of the 3D line segment include: a mid-point of the 3D line segment; a length of the 3D line segment; and an orientation of the 3D line segment. In some aspects, the orientation of the 3D line segment is determined based on an orientation of a lane on a road.

In some aspects, the method, apparatuses, and computer-readable medium described above can include, after determining the 3D line segment: projecting the first 3D representation of the first 2D keypoint onto a first projected pixel position in the image and projecting the second 3D representation of the second 2D keypoint onto a second projected pixel position in the image; determining a projection error based on a first difference between the first projected pixel position and the first pixel position, a second difference between the second projected pixel position and the second pixel position, or both; and minimizing the projection error by adjusting the first 3D representation of the first 2D keypoint, the second 3D representation of the second 2D keypoint, or both.

In some cases, to minimize the projection error, the method, apparatuses, and computer-readable medium described above can include determining a least squares solution for the projection error. In some cases, to determine the least squares solution, the method, apparatuses, and computer-readable medium described above can include determining a linear least squares solution. In some cases, to determine the least squares solution, the method, apparatuses, and computer-readable medium described above can include determining a non-linear least squares regression. In some examples, an initial estimate provided for determining the non-linear least squares regression includes a linear least squares regression.

In some aspects, a first 2D keypoint of the plurality of 2D keypoints includes a first pixel position in the image, a second 2D keypoint of the plurality of 2D keypoints includes a second pixel position in the image, and a third 2D keypoint of the plurality of 2D keypoints includes a third pixel position in the image. In some cases, to determine the 3D representation associated with the plurality of 2D keypoints, the method, apparatuses, and computer-readable medium described above can include determining a 3D rectangle formed by a first 3D representation of the first 2D keypoint, a second 3D representation of the second 2D keypoint, and a third 3D representation of the third 2D keypoint.

In some aspects, the information associated with the contour of the surface includes a plane associated with the surface and the 3D rectangle is constrained to be included in the plane.

In some aspects, to determine the 3D rectangle, the method, apparatuses, and computer-readable medium described above can include determining estimated parameters of the 3D rectangle. In some examples, the estimated parameters of the 3D rectangle include: a mid-point of the 3D rectangle; a length of a long side of the 3D rectangle; a length of a short side of the 3D rectangle; and an orientation of the 3D rectangle. In some cases, the orientation of the 3D rectangle is determined based on an orientation of a lane on a road.

In some aspects, the method, apparatuses, and computer-readable medium described above can include, after determining the 3D rectangle: projecting the first 3D representation of the first 2D keypoint onto a first projected pixel position in the image, projecting the second 3D representation of the second 2D keypoint onto a second projected pixel position in the image, and projecting the third 3D representation of the third 2D keypoint onto a third projected pixel position; determining a projection error based on at least one of a first difference between the first projected pixel position and the first pixel position, a second difference between the second projected pixel position and the second pixel position, and a third difference between the third projected pixel position and the third pixel position; and minimizing the projection error by adjusting at least one of the first 3D representation of the first 2D keypoint, the second 3D representation of the second 2D keypoint, and the third 3D representation of the third 2D keypoint.

In some aspects, to minimize the projection error, the method, apparatuses, and computer-readable medium described above can include determining a least squares solution for the projection error. In some aspects, the least squares solution includes a linear least squares solution. In some aspects, to determine the least squares solution, the method, apparatuses, and computer-readable medium described above can include determining a non-linear least squares regression. In some aspects, an initial estimate provided for determining the non-linear least squares regression includes a linear least squares estimate.

In some aspects, one or more of the apparatuses described above is, is part of, or includes a mobile device (e.g., a mobile telephone or so-called "smart phone" or other mobile device), a wearable device, an extended reality device (e.g., a virtual reality (VR) device, an augmented reality (AR) device, or a mixed reality (MR) device), a personal computer, a laptop computer, a server computer, a vehicle (e.g., a computing device of a vehicle), or other device. In some aspects, an apparatus includes a camera or multiple cameras for capturing one or more images. In some aspects, the apparatus includes a display for displaying one or more images, notifications, and/or other displayable data. In some aspects, the apparatus can include one or more sensors. In some cases, the one or more sensors can be used for determining a position and/or pose of the apparatus, a state of the apparatuses, and/or for other purposes.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
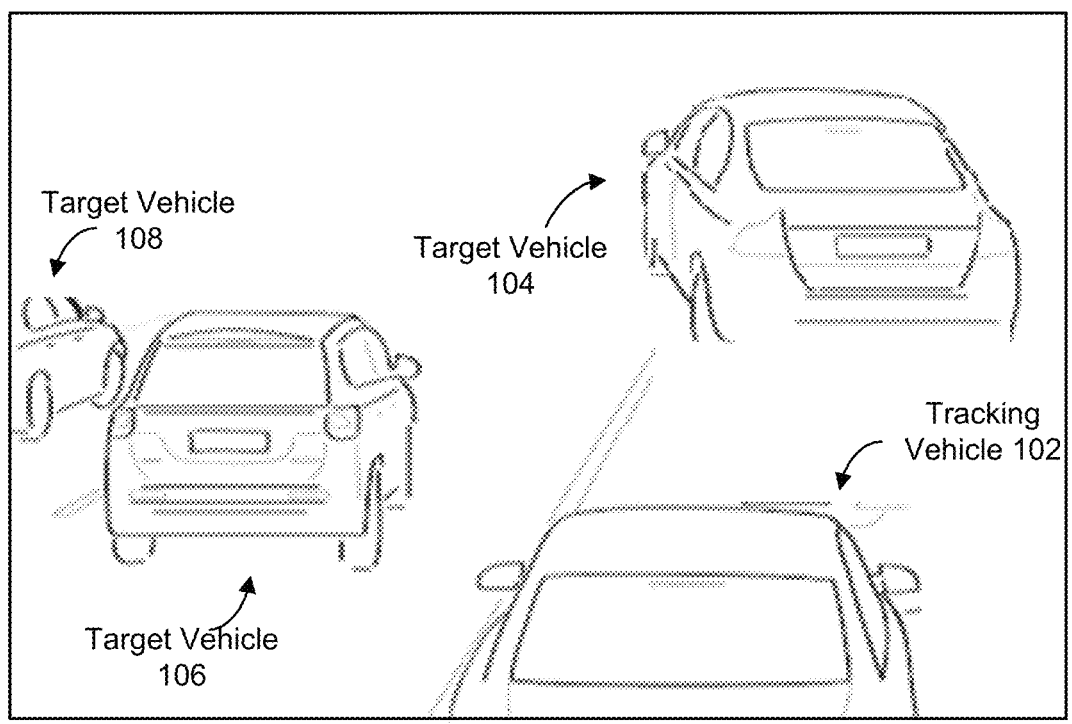
FIG. 1 is an image illustrating multiple vehicles driving on a road, in accordance with some examples.

Certain aspects and embodiments of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects and embodiments described herein can be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes can be made in the function and arrangement of elements without departing from the spirit and scope of the application as set forth in the appended claims.

The terms "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Object detection can be used to detect or identify an object in an image or frame. Object tracking can be performed to track the detected object over time. For example, an image of an object can be obtained, and object detection can be performed on the image to detect one or more objects in the image. In some cases, an object detector used to detect the object can classify the detected object into a class or category of object. The object detector can generate a bounding region to identify a position of the object in the image. In some cases, the bounding region can be displayed in the image in order to identify the object to a user viewing a display. In some cases, the object detector can identify one or more keypoints (e.g., points of interest) associated with the object. For example, the object detector can identify the position of one or more wheels of the vehicle and/or the point where the wheels of the vehicle contact a road or other surface, referred to as wheel keypoints herein. Various types of systems can be used for object detection, including machine-learning based object detectors (e.g., using one or more deep neural networks).

Object detection and tracking can be used in driving systems, video analytics, security systems, robotics systems, aviation systems, extended reality (XR) systems (e.g., augmented reality (AR) systems, virtual reality (VR) systems, mixed reality (MR) systems, etc.), among other systems. In such systems, an object (referred to as a tracking object) tracking other objects (referred to as target objects) in an environment can determine positions and/or sizes of the other objects. Determining the positions and/or sizes of target objects in the environment allows the tracking object to accurately navigate the environment by making intelligent motion planning and trajectory planning decisions.

As noted above, machine-learning models (e.g., deep neural networks) can be used for performing object detection and localization in some cases. Machine-learning based object detection can be computationally intensive, can be difficult to implement in contexts where detection speed is a high-priority, among other difficulties. For example, machine-learning based object detection can be computationally intensive as they are typically run on the entire image and (either implicitly or explicitly) at various scales to capture target objects (e.g., target vehicles) at different distances from a tracking object (e.g., a tracking or ego vehicle). Examples of the numerous scales that may be considered by a neural-network based object detector are shown in and described below with respect to FIG. 12A-FIG. 12C and FIG. 13A-FIG. 13C.

Systems, apparatuses, processes (methods), and computer-readable media (collectively referred to as "systems and techniques") are described herein that provide solutions to improve object detection and tracking. The systems and techniques described herein can be applied to any scenario, such as scenarios where fast and/or accurate detections are necessary, where compute resources are limited, among others. In some approaches, a detection and tracking system of a tracking object (e.g., a tracking vehicle) can receive or obtain images containing a target object (e.g., a target vehicle). The detection and tracking system can use the images to perform an object detection and tracking process.

In some cases, the detection and tracking system can track (e.g., using an object tracker) the position of the target object over time (e.g., in one or more images or frames that are subsequent to the image or frame in which the object was detected). Although various object trackers can be used, depending on the desired implementation, in some examples, the object tracker may be (or may include) a Kalman filter, an extended Kalman filter, a particle filter, any combination thereof, and/or other object tracker. Object tracking can be performed across multiple successive images (or frames), for example, that are received by the tracking object, e.g., captured by an image-capture device, such as a camera, Light Detection and Ranging (LiDAR)

sensor, and/or a radar sensor of the tracking object). Object tracking can also be performed using data (e.g., images or frames) from multiple different sensors. In one illustrative example, object tracking can be performed by a detection and tracking system that analyzes data from both a LiDAR sensor and an image-capture device. In some cases, two-dimensional (2D) representations of objects captured by sensors such as the image-capture device, LiDAR, and/or radar can be converted to a three-dimensional (3D) representation of the environment surrounding the tracking object.

In some cases, the systems and techniques can determine a fixed physical configuration of a target object and can use the fixed physical configurations to more accurately estimate a position (or location) of the target object. For example, in the case the wheels of a vehicle driving on a road (or on another surface), a detection and tracking system can leverage the assumption that the lowermost ends of the wheels (e.g., referred to as wheel keypoints) are positioned on the road and that the wheels are configured in a known geometry and/or shape. For example, the wheels on a car or truck can form a rectangle and the wheels on a motorcycle can be connected (or joined) by a line segment. In addition, some detection and tracking systems may also generate 3D models of the environment surrounding the tracking object, including a 3D map of the road (or other surface) on which the vehicle is driving. In some cases, the road can be represented as a plane in the 3D map, referred to herein as a road plane or a ground plane. In some cases, the detection and tracking system can constrain the rectangle (or other shape) formed by the vehicle wheels such that the 3D representation of the rectangle (or other shape) is on the road plane. In some cases, using the constraint that the rectangle formed by the wheels is on the road plane can improve the accuracy of the estimated 3D position of the target object (and its wheels). For example, the constraint that the wheels of a vehicle form a rectangle on the road plane can improve lateral and longitudinal positioning error of 3D estimated wheel positions, such as when compared with a naive approach that separately estimates each of the 3D wheel positions of a vehicle without applying similar constraints.

Aspects are described herein using vehicles as illustrative examples of tracking objects and target objects. However, one of ordinary skill will appreciate the systems and related techniques described herein can be included in and performed by any other system or device for detecting and/or tracking any type of objects in one or more images. Examples of other systems that can perform or that can include components for performing the techniques described herein include robotics systems, XR systems (e.g., AR systems, VR systems, MR systems, etc.), video analytics, security systems, aviation systems, among others systems. Examples of other types of objects that can be detected include people or pedestrians, infrastructure (e.g., roads, signs, etc.), among others. In one illustrative example, a tracking vehicle can perform one or more of the techniques described herein to detect a pedestrian or infrastructure object (e.g., a road sign) in one or more images.

Various aspects of the application will be described with respect to the figures. FIG. 1 is an image 100 illustrating an environment including numerous vehicles driving on a road. The vehicles include a tracking vehicle 102 (as an example of a tracking object), a target vehicle 104, a target vehicle 106, and a target vehicle 108 (e.g., as examples of tracking object). The tracking vehicle 102 can track the target vehicles 104, 106, and 108 in order to navigate the environment. For example, the tracking vehicle 102 can determine the position and/or size of the target vehicle 104 to determine when to slow down, speed up, change lanes, and/or perform some other function. While the vehicle 102 is referred to as a tracking vehicle 102 and the vehicles 104, 106, and 108 are referred to as target vehicles with respect to FIG. 1, the vehicles 104, 106, and 108 can also be referred to as tracking vehicles if and when they are tracking other vehicles, in which the other vehicles become target vehicles.

Figure 2:
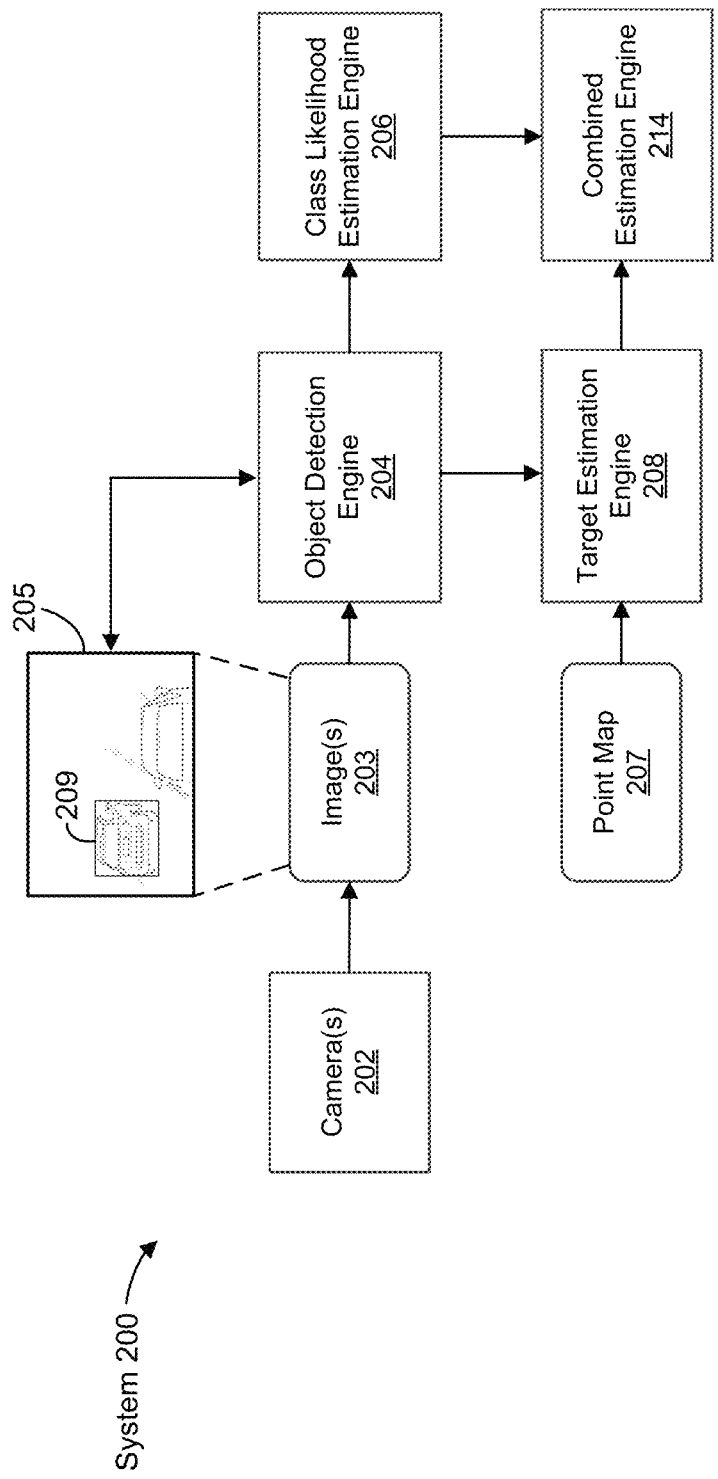
FIG. 2 is a block diagram illustrating an example of system for determining sizes, positions, and orientations of objects, in accordance with some examples.

FIG. 2 is a block diagram illustrating an example of a system 200 for determining the sizes and/or positions of objects in an environment. In some cases, the system 200 can be included in a tracking object that tracks one or more target objects. As noted above, a tracking object refers to an object that tracks one or more other objects, which are referred to as target objects. In one illustrative example, the system 200 can include or be part of an autonomous driving system included in an autonomous vehicle (as an example of a tracking object). In another illustrative example, the system 200 can include or be part of an autonomous navigation system included in a robotics device or system. While examples are described herein using autonomous driving systems and autonomous vehicles for illustrative purposes, one of ordinary skill will appreciate the system 200 and related techniques described herein can be included in and performed by any other system or device for determining the sizes and/or positions of objects.

The system 200 can be used to estimate the positions and/or sizes of objects in an environment using image-based keypoint detection (e.g., of wheel keypoints), corresponding object type classifications from camera-based object detection, a combination thereof, and/or using information from one or more additional sensors. In some cases, in addition to or as an alternative to using the keypoint detections and type classifications the system 200 can estimate the positions and sizes of objects in the environment by combining position and dimension estimates from the keypoint detection and/or type classifications with information from other sensors. In one illustrative example, the system 200 can estimate the positions and/or sizes of target vehicles detected on a road using wheel keypoint detections and corresponding vehicle type classifications from cameras, point detections from radars, object detections from imaging radars, object detections from LiDAR, other sensors that collect data about objects in the environment, or any combination thereof. As described in more detail below, the system 200 can apply any combination of one or more of a camera-based object-type likelihood filter, a target position estimation technique for object (e.g., vehicle or other object), target dimension estimation (e.g., based on observed wheel keypoint positions), a radar-based length estimation technique, and/or imaging radar-based object detections, and can implement a combined estimation model to track the best estimate of the size (e.g., length and/or other size dimension) of an object using all available provided measurements.

The system 200 includes various components, including one or more cameras 202, an object detection engine 204, a classification (class) likelihood estimation engine 206, a target estimation engine 208, and a combined estimation engine 214. The components of the system 200 can include software, hardware, or both. For example, in some implementations, the components of the system 200 can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the computing device implementing the system 200.

While the system 200 is shown to include certain components, one of ordinary skill will appreciate that the system 200 can include more or fewer components than those shown in FIG. 2. For example, the system 200 can include, or can be part of a computing device or object that includes, one or more input devices and one or more output devices (not shown). In some implementations, the system 200 may also include, or can be part of a computing device that includes, one or more memory devices (e.g., one or more random access memory (RAM) components, read-only memory (ROM) components, cache memory components, buffer components, database components, and/or other memory devices), one or more processing devices (e.g., one or more CPUs, GPUs, and/or other processing devices) in communication with and/or electrically connected to the one or more memory devices, one or more wireless interfaces (e.g., including one or more transceivers and a baseband processor for each wireless interface) for performing wireless communications, one or more wired interfaces (e.g., a serial interface such as a universal serial bus (USB) input, a lightening connector, and/or other wired interface) for performing communications over one or more hardwired connections, and/or other components that are not shown in FIG. 2.

As noted above, the system 200 can be implemented by and/or included in a computing device or other object. In some cases, multiple computing devices can be used to implement the system 200. For example, a computing device used to implement the system 200 can include a computer or multiple computers that are part of a device or object, such as a vehicle, a robotic device, a surveillance system, and/or any other computing device or object with the resource capabilities to perform the techniques described herein. In some implementations, the system 200 can be integrated with (e.g., integrated into the software, added as one or more plug-ins, included as one or more library functions, or otherwise integrated with) one or more software applications, such as an autonomous driving or navigation software application or suite of software applications. The one or more software applications can be installed on the computing device or object implementing the system 200.

The one or more cameras 202 of the system 200 can capture one or more images 203. In some cases, the one or more cameras 202 can include multiple cameras. For example, an autonomous vehicle including the system 200 can have a camera or multiple cameras on the front of the vehicle, a camera or multiple cameras on the back of the vehicle, a camera or multiple cameras on each side of the vehicle, and/or other cameras. In another example, a robotic device including the system 200 can include multiple cameras on various parts of the robotics device. In another example, aviation device including the system 200 can include multiple cameras on different parts of the aviation device.

The one or more images 203 can include still images or video frames. The one or more images 203 each contain images of a scene. An example of an image 205 is shown in FIG. 2. The image 205 illustrates an example of an image captured by a camera of a tracking vehicle, including multiple target vehicles. When video frames are captured, the video frames can be part of one or more video sequences. In some cases, the images captured by the one or more cameras 202 can be stored in a storage device (not shown), and the one or more images 203 can be retrieved or otherwise obtained from the storage device. The one or more images 203 can be raster images composed of pixels (or voxels) optionally with a depth map, vector images composed of vectors or polygons, or a combination thereof. The images 203 may include one or more two-dimensional representations of a scene along one or more planes (e.g., a plane in a horizontal or x-direction and a plane in a vertical or y-direction), or one or more three dimensional representations of the scene.

The object detection engine 204 can obtain and process the one or more images 203 to detect and/or track one or more objects in the one or more images 203. The object detection engine 204 can output objects as detected and tracked objects. The object detection engine 204 can determine a classification (referred to as a class) or category of each object detected in an image, and can also generate a bounding region for identifying each object in the image (e.g., bounding region 209 identifying a target vehicle in the image 205). For instance, an object can be detected in an image, and a bounding region and class label (also referred to as a category label) can be output by the object detection engine 204 for the detected object. The bounding region can be used by other components of the system 200 to identify a region of the image that includes the detected object. In some cases, the dimensions of a bounding region (e.g., the width and/or height, the length of a diagonal, such as from a bottom-left corner to a top-right corner of from a top-left corner to a top-right corner, or other dimensions) can also be output by the object detection engine 204. A bounding region assigned to a detected object can include a bounding box, a bounding circle, a bounding ellipse, or any other suitably-shaped region representing a detected object. While examples are described herein using bounding boxes for illustrative purposes, the techniques and systems described herein can also apply using other suitably shaped bounding regions. A bounding box associated with a detected object can have a rectangular shape, a square shape, or other suitable shape In some cases, in addition to a bounding box, the object detection engine 204 can output positions of localized features (also referred to as keypoints) associated with the target object. For example, the object detection engine 204 can detect and output keypoints associated with points of contact between the object and a surface. In one illustrative example, the object detection engine 204 can output keypoints for points of contact between wheels of a vehicle and a road, referred to as wheel keypoints herein.

Figure 3A:
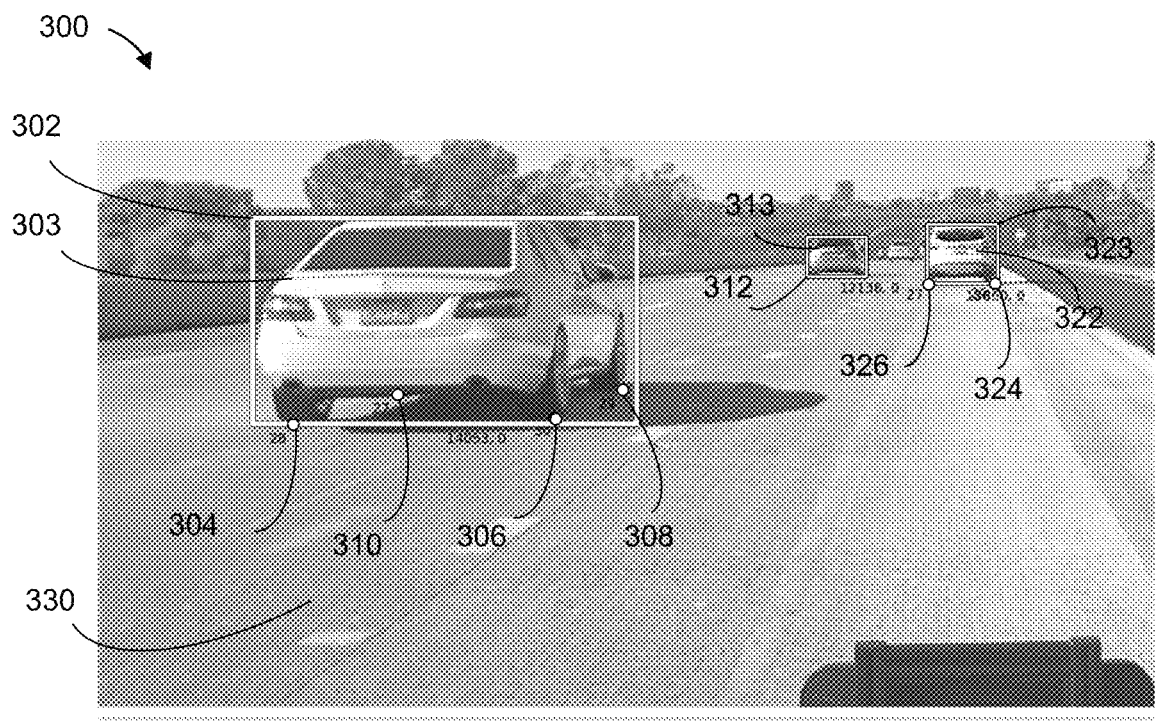
FIG. 3A is an image illustrating example of bounding boxes and vehicle wheel keypoint positions overlaid on a captured image, in accordance with some examples.
Figure 3B:
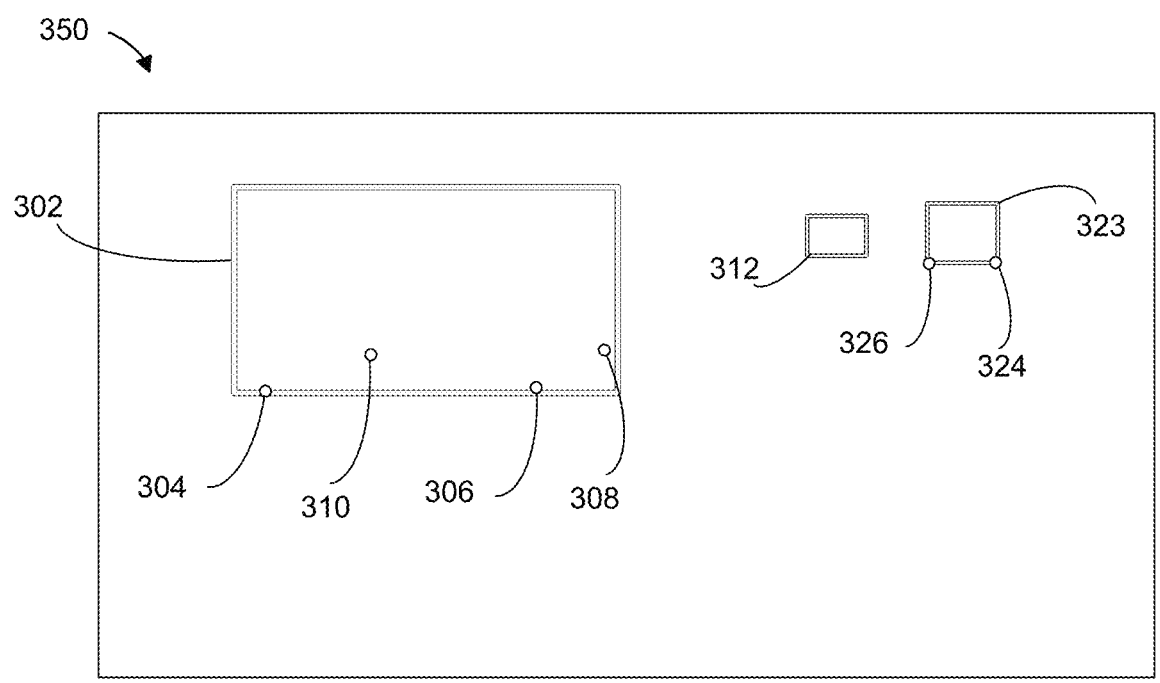
FIG. 3B is an image illustrating example of the bounding boxes and vehicle wheel keypoint positions shown in FIG. 3A with the underlying captured image removed, in accordance with some examples.

FIG. 3A illustrates an example captured image 300 (which can correspond to example image 205 shown in FIG. 2) overlaid with example features that can be detected by an object detection engine (e.g., object detection engine 204 shown in FIG. 2). In the illustrated example of FIG. 3A, the captured image 300 can be obtained by a camera of a tracking (or ego) vehicle (e.g., one or more cameras 202 shown in FIG. 2). The object detection engine can perform object detection and/or classification to detect the position of objects (e.g., target vehicles) in the image. In the illustrated example, a first bounding box 302 associated with a first target vehicle 303 is shown as a rectangle bounding the target vehicle. The object detection engine 204 can also detect wheel keypoints 304, 306, and 308 associated with contacts points between three tires of the target vehicle 303 visible in the image 300 and the road 330. As shown in FIG. 3A, the object detection engine 204 can also detect keypoints associated with other features of the target vehicle 303. For example, keypoint 310 can represent a point between a fourth tire of the target vehicle 303 and the road 330. Image 300 also includes bounding box 312 for a second target vehicle 313 and bounding box 322 for a third vehicle 323. In the illustrated example, wheel keypoints 324 and 326 for the visible wheels (also referred to as observed wheels herein) of the third target vehicle 323 are shown. Image 350 shown in FIG. 3B provides an illustrative example of object features output by an object detection engine (e.g., object detection engine 204 shown in FIG. 2) with the underlying captured image 300 removed.

Returning to FIG. 2, any suitable object detection and/or classification technique can be performed by the object detection engine 204. In some cases, the object detection engine 204 can use a machine learning based object detector, such as using one or more neural networks. For instance, a deep learning-based object detector can be used to detect and classify objects in the one or more images 203. In one illustrative example, a Cifar-10 neural network based detector can be used to perform object classification to classify objects. In some cases, the Cifar-10 detector can be trained to classify only certain objects, such as vehicles only. Further details of the Cifar-10 detector are described below with respect to FIG. 11.

Another illustrative example of a deep learning based detector is a fast single-shot object detector (SSD) including a neural network and that can be applied for multiple object categories. A feature of the SSD model is the use of multi-scale convolutional bounding box outputs attached to multiple feature maps at the top of the neural network. Such a representation allows the SSD to efficiently model diverse bounding box shapes. It has been demonstrated that, given the same VGG-16 base architecture, SSD compares favorably to its state-of-the-art object detector counterparts in terms of both accuracy and speed. An SSD deep learning detector is described in more detail in K. Simonyan and A. Zisserman, "Very deep convolutional networks for large-scale image recognition," CoRR, abs/1409.1556, 79014, which is hereby incorporated by reference in its entirety for all purposes. Further details of the SSD detector are described below with respect to FIG. 12A through FIG. 12C.

Another illustrative example of a deep learning-based detector that can be used to detect and classify objects in the one or more images 203 includes the You only look once (YOLO) detector. The YOLO detector, when run on a Titan X, processes images at 40-90 fps with a mAP of 78.6% (based on VOC 2007). A YOLO deep learning detector is described in more detail in J. Redmon, S. Divvala, R. Girshick, and A. Farhadi, "You only look once: Unified, real-time object detection," arXiv preprint arXiv: 1506.02640, 2015, which is hereby incorporated by reference in its entirety for all purposes. Further details of the YOLO detector are described below with respect to FIG. 13A-FIG. 13C. While the Cifar-10, SSD, and YOLO detectors are provided as illustrative examples of deep learning-based object detectors, one of ordinary skill will appreciate that any other suitable object detection and classification can be performed by the object detection engine 204.

For a given image from which one or more target objects are detected, the class likelihood estimation engine 206 can obtain the bounding regions, feature keypoints, and the class or classes determined for the one or more target objects and/or target object features. For example, for a target object detected in an image, the class likelihood estimation engine 206 can obtain the bounding region and the class (or classes) determined for the target object by the object detection engine 204. The class likelihood estimation engine 206 can use the class(es), bounding region, and/or feature keypoints for each target object to determine a likelihood that the target object is of a particular class of object. In some cases, the class likelihood estimation engine 206 can include a likelihood filter. The likelihood filter can be used to track the likelihood that a particular target object includes various classes by combining the information from various class labels output by the object detection engine 204 for the particular target object based on the processing of images provided from the one or more cameras 202 over a tracking history for the particular target object. For example, multiple images of the target object from one or multiple cameras can be processed and the target object can be detected in each of the multiple images. The tracking history for a target object can include the detections of that target object in all images since the first detection of that object in an image. A class is determined for each detection of the target object in each image, resulting in the possibility that multiple classes can be determined for the target object across the multiple images. The multiple classes can be processed by the likelihood filter to determine a likelihood that the target object is of a particular class of object. Based on the likelihood, the class likelihood estimation engine 206 can determine a most likely class for the target object.

The class likelihood estimation engine 206 can determine a weight for each class of the various classes determined for the target object across the multiple images. A higher weightage is determined for classes associated with object detection results that are considered to be more certain. The certainty of an object detection result and the associated class resulting from that object detection result can be based on a distance between the target object and the tracking object including the system 200, in which case the weight assigned to that class can be based on the distance. In some cases, the distance used to determine the weight for a class can be based on the distance between the target object detected in an image and the camera on the tracking object used to capture that image. In some cases, the weight for a class can also be based on a confidence score output by the object detection, which indicates a confidence (e.g., a probability) that the target object is of the given class.

In one illustrative example, for each class c, a term $cw_c$ denotes the cumulative weight of all observed classes that have been received for a given tracked object. Every time a new detection y of class c is received by the class likelihood estimation engine 206, the cumulative weight $cw_c$ of the class c can be updated to include the weight $w_y$ assigned to the new detection. In one example, the following formulation can be used to update the cumulative weight $cw_c$ for the class c as shown in Equation (1):

$$cw_c = cw_c + w_y \quad (1)$$

where $w_y$ can be determined as shown in Equation (2):

$$w_y = \frac{A}{B + \|x_{target} - x_{tracking}\|} \quad (2)$$

In Equation (2), the terms A and B are positive constants, $x_{target}$ is the estimated position of the target object at the time of the detection, and $x_{tracking}$ is the estimated position of the tracking object (or the estimated position of the camera, on the tracking object, that was used to capture the image of the target object) at the time of the detection. The positive constants A and B can be set to any suitable values. In one illustrative example, A is equal to 50 meters (m) and B is equal to 5 m, assuming position is represented in meters.

Using vehicles as an illustrative example, when a tracking vehicle (sometimes referred to as an ego vehicle) is tracking a target vehicle, $x_{target}$ is the estimated position of the target vehicle at the time of detection of the target vehicle in an image, and $x_{tracking}$ is the estimated position of the tracking (ego) vehicle (or the estimated position of a camera used to capture the image of the target vehicle) at the time of the detection of the target vehicle in the image. As can be seen by Equation (2), the larger the distance between the target object and the tracking object (or camera thereof) for a given detection of the target object, the larger the weight $w_y$ is for the class determined by that detection of the target object. As illustrated by equation (1), the weight $w_y$ assigned to a class c determined by a given detection of the target object is added to the cumulative weight $cw_c$ for that class c. Each different class determined for the target object can be updated using Equation (1) and Equation (2), or using another suitable technique.

The likelihood of a class c can be determined as the following ratio shown in Equation (3):

$$L_c = \frac{cw_c}{\sum_i cw_i} \qquad (3)$$

where $cw_i$ represents cumulative weights for different classes i across all detections of the target object being analyzed. In one illustrative example, a cumulative weight $cw_i$ can be maintained for a first class (e.g., a "car" class), a cumulative weight $cw_2$ can be maintained for a second class (e.g., a "truck" class), and a cumulative weight $cw_3$ can be maintained for a third class (e.g., a "motorcycle" class) for which a target object has been classified during its tracking history. In such an example, for a current image in which the target object is detected and classified, the cumulative weight $cw_1$ for a "car" class can have a current value of 70, the cumulative weight $cw_2$ for a "truck" class can have a current value of 25, and the cumulative weight $cw_3$ for a "motorcycle" class can have a current value of 5. Using such example values and Equation (3), the likelihood that the target object is a "car" is determined as $$\frac{70}{70+25+5}$$

(corresponding to a value of 0.7). Similarly, the likelihood $L_c$, that the target object is a "truck" is determined as $$\frac{25}{70+25+5}$$

(corresponding to a value of 0.25), and the likelihood $L_c$, that the target object is a "motorcycle" is determined as $$\frac{5}{70+25+5},$$

corresponding to a value of 0.05).

The best estimate of the class of the target object for a given image or group of images is given by the class with the highest likelihood accumulated over the entire tracking history of detections of the target object. For instance, continuing with the example above, the best estimate of the class of the vehicle can be the "car" class, due to the "car" class having the highest likelihood over the target vehicle's tracking history out of the "car," "truck," and "motorcycle" classes. The object class estimated by the class likelihood estimation engine 206 can be used to define upper and lower limits to the size (e.g., the length, width, and/or height) of the target object. For example, the upper and lower limits for the length of a "car" class can be based on the smallest length and the largest length, respectively, of all known cars. As described in more detail below, the upper and lower limits can be used by the combined estimation engine 214 when estimating the size of a target object.

The target estimation engine 208 can utilize information from the map (e.g., point map 207) in combination with the detected object bounding box and/or wheel keypoints for determining an estimated three-dimensional (3D) position (and/or orientation) and an estimated size (e.g., one or more dimensions) of a target object detected in an image. In one example using autonomous vehicles for illustrative purposes, the object detection engine 204 can output to the target estimation engine 208 wheel keypoint positions where the wheel keypoint positions represent points of contact between observed wheels of the vehicle and the road detected in the image. Example wheel keypoints 304, 306, 308 of vehicle 303 are shown in the image 300 of FIG. 3A. In some cases, the object detection engine 204 can also output the class of the vehicle that was detected (e.g., a "car," "truck," "motorcycle," etc.).

Because the wheel keypoints (e.g., wheel keypoints 304, 306, 308, and 310 shown in FIG. 3A and FIG. 3B) from object detection are determined as pixel positions in a 2D image, the 3D positions of the wheels cannot be directly determined from the wheel keypoints. The target estimation engine 208 can perform an inverse perspective mapping (IPM) technique to determine an estimated 3D position (and/or orientation) of the wheel/road contact points of the target object detected in the image as wheel keypoints. As an example of an IPM technique, estimated 3D vehicle wheel positions of a target vehicle can be projected onto the image in which the target object is detected. The projected pixel positions of the estimated 3D vehicle wheel positions can be compared with pixel positions of the wheel keypoints determined by the object detection engine 204.

In some cases, the IPM technique can be used to determine a 6-degrees of freedom (6-DoF) pose of the target object, which includes a 3D position and a 3D orientation. For instance, the 6-DoF pose can include a 3D rotational vector (including angles for pitch along the transverse axis, roll along the longitudinal axis, and yaw along the normal axis) and a 3D translational vector (including translation in the horizontal (x) direction, vertical (y) direction, and depth (z) direction)). The pitch, roll, and yaw relative to a camera can be conceptualized as the yaw being the camera's horizontal rotation relative to the ground (e.g., left-to-right relative to the horizontal axis), the pitch being the camera's vertical rotation relative to the ground (e.g., up and down relative to the horizontal axis), and the roll being the camera's side-to-side rotation relative to the horizon (e.g., side-to-side relative to the horizontal axis). The 3D orientation (or, in some cases, a component of the 3D orientation, such as the yaw) can be determined by determining a direction vector between two wheels of the vehicle, and the 3D position can be determined using 3D wheel position estimation techniques (which can include IPM techniques) described with respect to FIG. 6 and FIG. 7 below. The 3D wheel position estimation techniques can combine information from the point map 207 with the 2D pixel positions of wheel keypoints to obtain a 3D position (and/or orientation) and size estimate (e.g., dimensions of a rectangle formed by the wheel base) of the detected vehicle. The target object wheel positions can be modeled as a rectangle or a line segment depending on the number of observed wheels in the captured 2D image. The position in the real-world (or pose) of the camera used to capture the image of the target object is also known. In some cases, using the point map 207, the wheel keypoints of a detected target object, and the position of the camera in the real-world, an estimate of the position and/or orientation of the target object in the real-world can be determined.

Figures 4A, 4B, 4C:
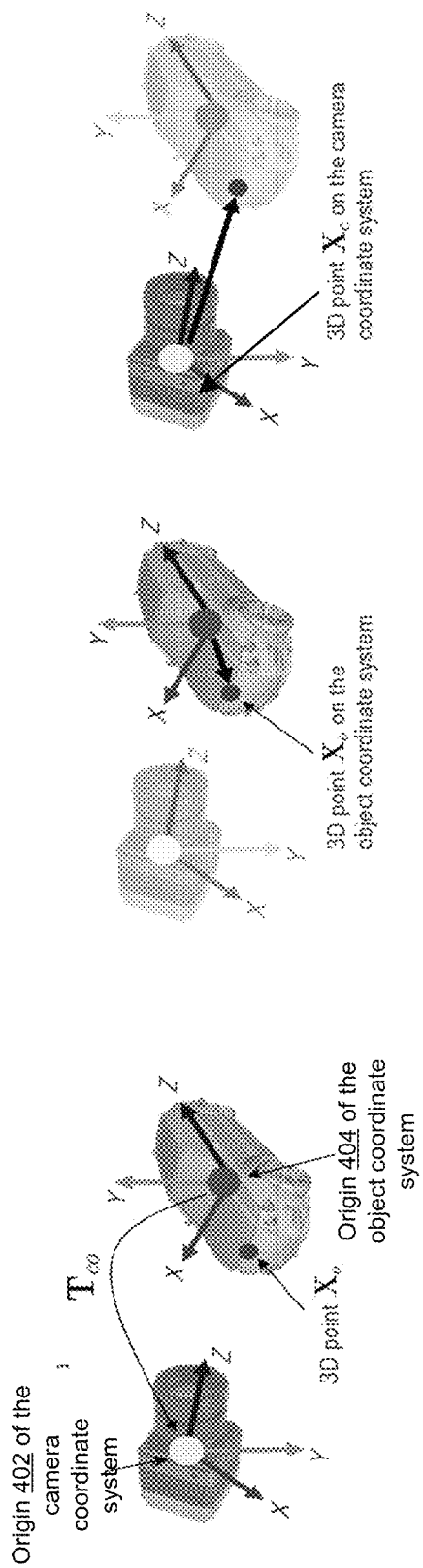
FIG. 4A-FIG. 4C are diagrams illustrating an example of coordinate transformations from an object coordinate system to a camera coordinate system, in accordance with some examples.

In some cases, one or more coordinate transformations may be required in order to project the estimated 3D vehicle wheel positions from the coordinate frame of reference of the point map 207 to the reference frame of the camera of the tracking vehicle. Illustrative examples of coordinate transformations that can be used for such a projection are shown in FIG. 4A through FIG. 4E. For example, FIG. 4A through FIG. 4C are diagrams illustrating an example of coordinate transformations from an object coordinate system to a camera coordinate system. Although the examples presented refer to transformations from an object coordinate system to a camera coordinate system, the same principles can be applied to perform a transformation from a map coordinate system (e.g., point map 207) to a camera coordinate system. For example, in a case where estimated 3D wheel positions are constrained to a road plane defined in the coordinate system of point map 207 the determined 3D wheel positions may require transformation into the camera coordinate system in order to project the 3D wheel positions onto an image plane.

FIG. 4A illustrates the origin 402 of the camera coordinate system (also referred to as the camera center), a 3D point $X_o$ from a plurality of 3D points in an object coordinate system, and the origin 404 of the object coordinate system. A transformation matrix $T_{co}$ is also shown. As illustrated in FIG. 4A, FIG. 4B, and FIG. 4C, the points (including the point $X_o$) on the object coordinate system are transformed into points (including point $X_c$) on the camera coordinate system. In some examples, Equation (4) can be used to compute the transformation:

$$\hat{X}_c = \begin{bmatrix} X_c \\ 1 \end{bmatrix} = T_{co}\hat{X}_o = T_{co}\begin{bmatrix} X_o \\ 1 \end{bmatrix} = \begin{bmatrix} R_{co}X_o + t_{co} \\ 1 \end{bmatrix} \quad (4)$$

In this equation, R includes the rotational parameters of the camera (e.g., pitch, yaw, and/or roll), and t is a translation vector (e.g., the physical position of the camera). Rotation and translation are intrinsic parameters of the camera. The rotational parameters R can be expressed using Equation (5):

$$R = \begin{bmatrix} 1 & 0 & 0 \\ 0 & \cos\gamma & -\sin\gamma \\ 0 & \sin\gamma & \cos\gamma \end{bmatrix}\begin{bmatrix} \cos\beta & 0 & \sin\beta \\ 0 & 1 & 0 \\ -\sin\beta & 0 & \cos\beta \end{bmatrix}\begin{bmatrix} \cos\alpha & -\sin\alpha & 0 \\ \sin\alpha & \cos\alpha & 0 \\ 0 & 0 & 1 \end{bmatrix} \quad (5)$$

In the above equation, $\alpha$ is the yaw (horizontal rotation), $\beta$ is the pitch (up-and-down rotation), and $\gamma$ is the roll (side-to-side rotation). The pitch, roll, and yaw relative to a camera can be conceptualized as the yaw being the camera's horizontal rotation relative to the ground (e.g., left-to-right relative to the horizontal axis), the pitch being the camera's vertical rotation relative to the ground (e.g., up and down relative to the horizontal axis), and the roll being the camera's side-to-side rotation relative to the horizon (e.g., side-to-side relative to the horizontal axis). The translation vector t can be expressed as shown in Equation (6):

$$t = \begin{bmatrix} X_T \\ Y_T \\ Z_T \end{bmatrix} \quad (6)$$

This mapping is also referred to as a projective transformation. The camera's intrinsic parameters can be expressed as shown in Equation (7):

$$K = \begin{bmatrix} f_x & S & x_c \\ 0 & f_y & y_c \\ 0 & 0 & 1 \end{bmatrix} \quad (7)$$

In the above matrix, $f_x$ and $f_y$ are the focal length of the camera along the x and y axis, respectively; $(x_c, y_c)$ is the center of the image plane 405 (shown in FIG. 4D and FIG. 4E); and S is a skew factor. Skew occurs when the 3D camera reference system is not precisely perpendicular to the image plane 405. The camera's intrinsic parameters, K, can next be used to map P' from the 3D camera reference system to the image plane 405.

Figure 4D:
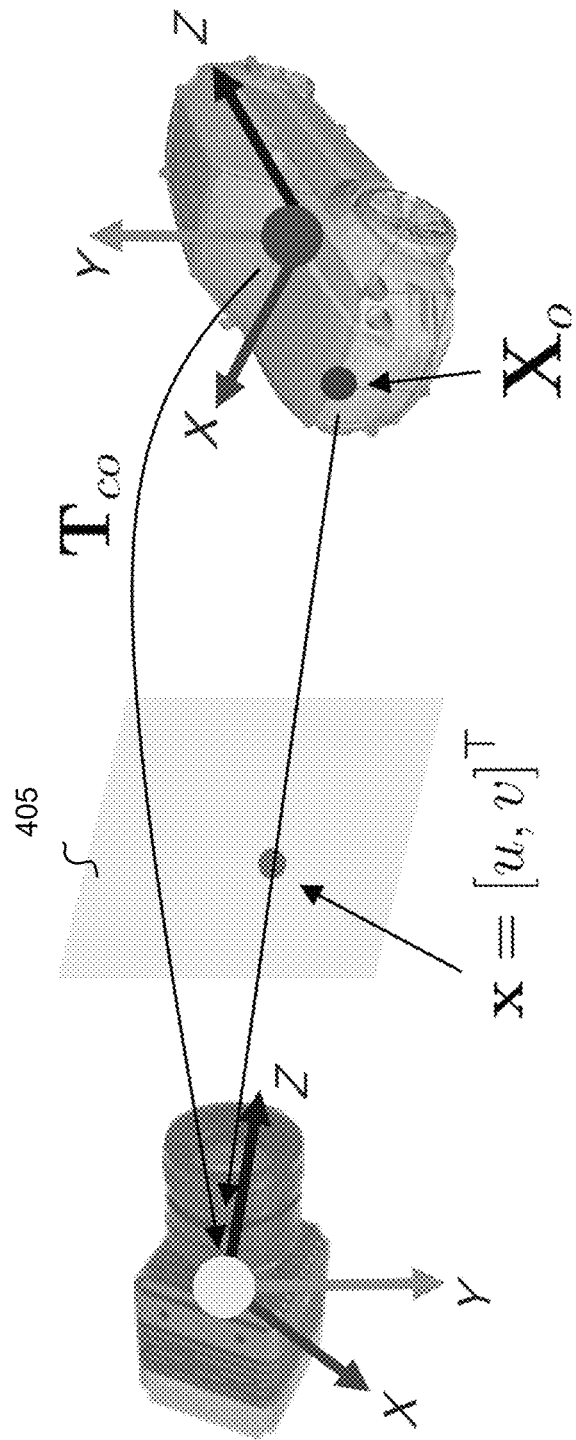
FIG. 4D is a diagram illustrating an example of a projection of a three-dimensional point on an object coordinate system to a two-dimensional point on an image, in accordance with some examples.

FIG. 4D is a diagram illustrating an example of a projection of the 3D point $X_o$ on the object coordinate system (from FIG. 4A through FIG. 4C) to a 2D point on the image. The 3D point $X_o$ on the object coordinate system can include a vertex on a 3D model of the object illustrated in the image. In some examples, the 3D point $X_o$ can projected to a 2D point on the image using Equation (8):

$$PT_{co}\hat{X}_o = \quad (8)$$

$$PT_{co}\begin{bmatrix} X_o \\ 1 \end{bmatrix} = P\begin{bmatrix} R_{co}X_o + t_{co} \\ 1 \end{bmatrix} = P\hat{X}_c = P\begin{bmatrix} X_c \\ 1 \end{bmatrix} = KX_c = \begin{bmatrix} \hat{x} \\ \hat{y} \\ \hat{z} \end{bmatrix} = \hat{x}$$

$$x = \begin{bmatrix} u \\ v \end{bmatrix} = \begin{bmatrix} \frac{\hat{x}}{\hat{z}} \\ \frac{\hat{y}}{\hat{z}} \end{bmatrix}$$

Continuing with the examples from FIG. 4A through FIG. 4D, FIG. 4E is a diagram illustrating an example of back-projection of a 2D point on an image to a camera coordinate system. Given a 2D image, the ray direction from each pixel can be determined. However, the depth (a distance from the origin 402 (or camera center) to a 3D point) is not known. For instance, back-projection of a 2D pixel point 406 can be computed as a directional vector $\vec{r}$ as shown in Equation (9):

$$\vec{r} = K^{-1}\hat{x} \quad (9)$$

Figure 4E:
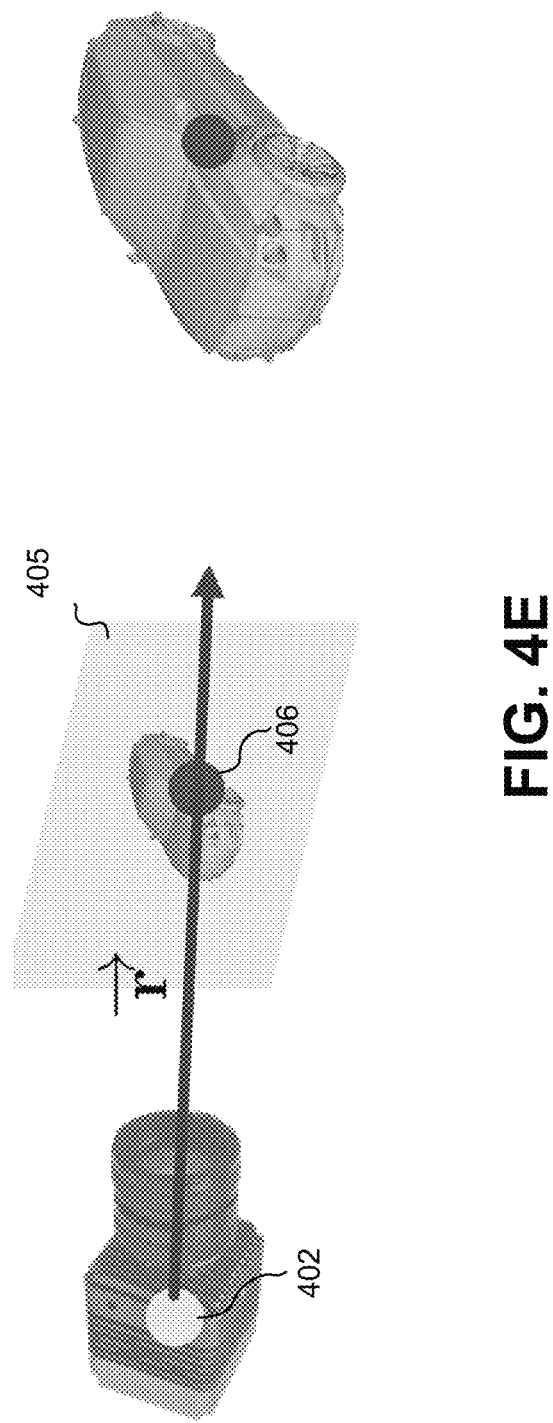
FIG. 4E is a diagram illustrating an example of back-projection of a two-dimensional point on an image to a camera coordinate system, in accordance with some examples.

The example projection described with respect to FIG. 4D and FIG. 4E and Equation (8) and Equation (9) provides is provided for the purposes of illustration only, and other projection techniques can be used without departing from the scope of the present disclosure.

Returning to FIG. 2, the point map 207 can include a plurality of map points corresponding to one or more reference locations in a 3D space. The point map 207 can be referred to in some cases as a high-definition (HD) map. In one example using autonomous vehicles as an illustrative example of objects, the points of the point map 207 define stationary physical reference locations related to roadways, such as road lanes and/or other data. For example, the point map 207 can represent lanes on the road as a connected set of points. Line segments are defined between two map points, where multiple line segments define the different lines of the lanes (e.g., boundary lines and center lines of a lane). The line segments can make up a piece-wise linear curve defined using the map points. For example, the connected set of points (or segments) can represent the center lines and the boundary lines of a lane on a road, which allow an autonomous vehicle to determine where it is located on the road and where target objects are located on the road. In some cases, the point map 207 can represent the road (or localized regions of the road) as a plane in 3D space (e.g., a road plane or ground plane). In some cases, different point maps can be maintained for different areas of the world (e.g., a point map for New York City, a point map for San Francisco, a point map for New Orleans, and so on). In some examples, the different point maps can be included in separate data files (e.g., Geo-JavaScript Object Notation (GeoJSON) files, ShapeFiles, comma-separated values (CSV) files, and/or other files).

As noted previously, for autonomous vehicles, the point map 207 can include a plurality of points representing lanes (as an example of "reference locations") on roads in the real world, where line segments are defined between two map points. In some cases, the reference locations in the point map 207 can be used to approximate a contour of the road. For example, in some cases, the contour of the road can be represented as a plane, which can sometimes be referred to as a road plane or a ground plane. The target estimation engine 208 of the system 200 implemented by a tracking vehicle can detect and track 3D position information associated with a target vehicle around the tracking vehicle using information associated with point map 207. A camera of the one or more cameras 202 included in tracking vehicle can capture an image of the target vehicle, and the target vehicle and wheel keypoints associated with the target vehicle can be detected in the captured image using the object detection engine 204. The target estimation engine 208 can utilize the road plane from the point map 207 to estimate the 3D positions of a target vehicle's wheels. For instance, the target estimation engine 208 can constrain estimated 3D pixel positions corresponding to the wheel keypoints in the image to be located on the road plane obtained from the point map 207.

In some cases, the target estimation engine 208 can utilize additional information from the point map 207 to constrain estimated 3D wheel positions. For example, the target estimation engine 208 can apply a map-based position association function to associate a point from a subset of points within the bounding box identifying the detected target vehicle in the image with points in the point map 207. When performed for autonomous driving, the map-based position association function can be referred to as map-based lane vehicle association (Map LVA), which can be used to associate each 2D bounding box for a detected target vehicle with a point from the subset of points from the point map, and based on the associated point in the point map, the Map LVA can associate the target vehicle with a particular lane on the road.

The combined estimation engine 214 can use any combination of the results from the class likelihood estimation engine 206, the target estimation engine 208, and/or other sensors to determine a size (e.g., a length and/or height) and a position and/or orientation of a target object. For example, in some cases, the combined estimation engine 214 can apply an estimation model that takes into account wheel positions (or, e.g., the position of the nearest wheel) from target estimation engine 208, the likelihood estimation from the class likelihood estimation engine 206, and/or information from other sensors such as LiDAR, radar, or the like to determine a final estimated size and/or position for a target object (e.g., a length of a target vehicle). In some implementations, the estimation model can include an estimation framework (e.g., a Bayesian estimation framework or other estimation model framework) that operates as a Kalman filter.

The combined estimation engine 214 can be used to filter the length and/or width estimates (e.g., length and/or width of the wheel base) of a target object (e.g., a target vehicle) obtained from the target estimation engine 208. In some cases, for certain objects (such as vehicles), the heights and widths of those objects do not vary by a large amount between different models of the same class of object (e.g., there is a small variance in width and sometimes height for different models of the same vehicle type). In such cases, the combined estimation engine 214 can predict the width and/or the length of a target object (e.g., a target vehicle or other object) as a constant based on the most likely class identified by the class likelihood estimation engine 206. The combined estimation engine 214 can also supplement length and/or width estimates from the target estimation engine 208 with height information based on the most likely class identified by the class likelihood estimation engine 206. In such an example, a full 3D representation of the target vehicle can be created. In some cases, the combined estimation engine 214 can also be used to combine data from multiple data sources (e.g., cameras 202, radar, LiDAR, or the like) in a vehicle tracking system to provide accurate estimates of velocity, acceleration, and/or other parameters associated with target objects (e.g., vehicles) in addition to size information.

Using different sources of information for different size and/or position estimations, such as the target estimation that utilizes results from image-based object detection and a radar-based estimation, can allow the different estimations to complement one another. For example, an image-based object detection (e.g., by target estimation engine 208, can provide the same or similar detection result for two different objects that are vastly different in length, due to a slight difference in yaw angle. A radar-based estimation can supplement the target estimation. Furthermore, radar sensors being less prone to varying weather conditions such as rain or snow, and not being affected by variations in exposure to sunlight, serve as a complementary solution to camera-based size estimation methods, thus improving overall system robustness. Utilizing the multiple sources of information can help the system 200 obtain highly accurate size and position estimations, allowing a tracking object that includes the system 200 to make more accurate estimates of the environment surrounding the tracking object. At the same time, improving the accuracy of the individual estimates, such as the improvements to 3D wheel position detection described herein, can improve the overall accuracy of the size and position estimations obtained by the system 200. For example, using the techniques described herein, an autonomous vehicle can make more accurate estimates of the space of a road that is available for maneuvering, such as for performing lane changes, overtaking other vehicles, stopping, speeding up, among others. In another example, a robotic device used for manufacturing can use the techniques described herein to more accurately identify the available space and parts that are available to the robotic device. Many other fields of technology can benefit from the accurate size and position (and/or orientation) estimation techniques provided herein.

Figure 5:
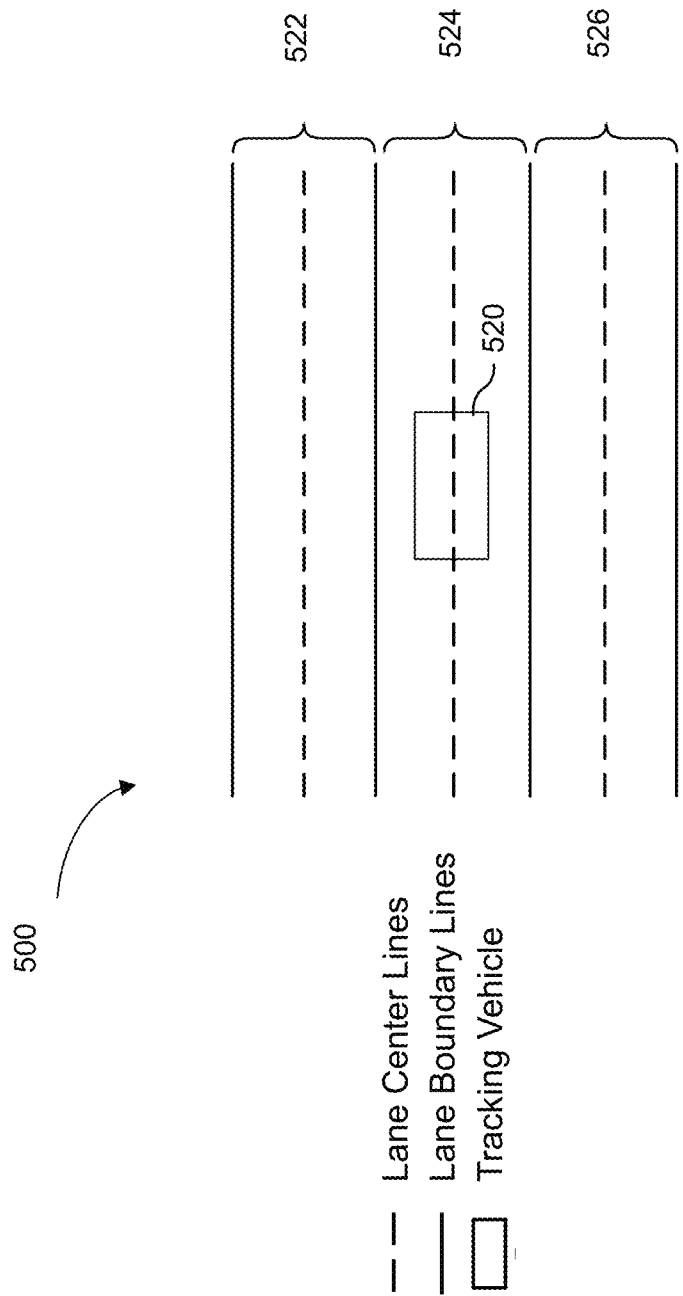
FIG. 5 is a diagram illustrating a bird's eye view of a three-dimensional (3D) map, in accordance with some examples.

FIG. 5 is a diagram illustrating an example of a map that can be included in the point map 207 and/or generated using points in the point map 207 corresponding to reference locations in an environment. The example in FIG. 5 shows three lanes of a highway from a top perspective view (or "birds eye view"), including a left lane 522, a middle lane 524, and a right lane 526. Each lane is shown with a center line and two boundary lines, with the middle lane 524 sharing a boundary line with the left lane 522 and the right lane 526. A tracking vehicle 520 is shown in the middle lane 524. One or more cameras on the tracking vehicle 520 can capture images of the environment surrounding the vehicle, as described herein. As noted above, the point map 207 can include points (or waypoints) representing the lines of the lanes. For example, each line can be defined by a number of points. In some cases, the road represented by the map 500 can be represented as a road plane in a three-dimensional representation of the tracking vehicle 520 and its surroundings.

Figure 6:
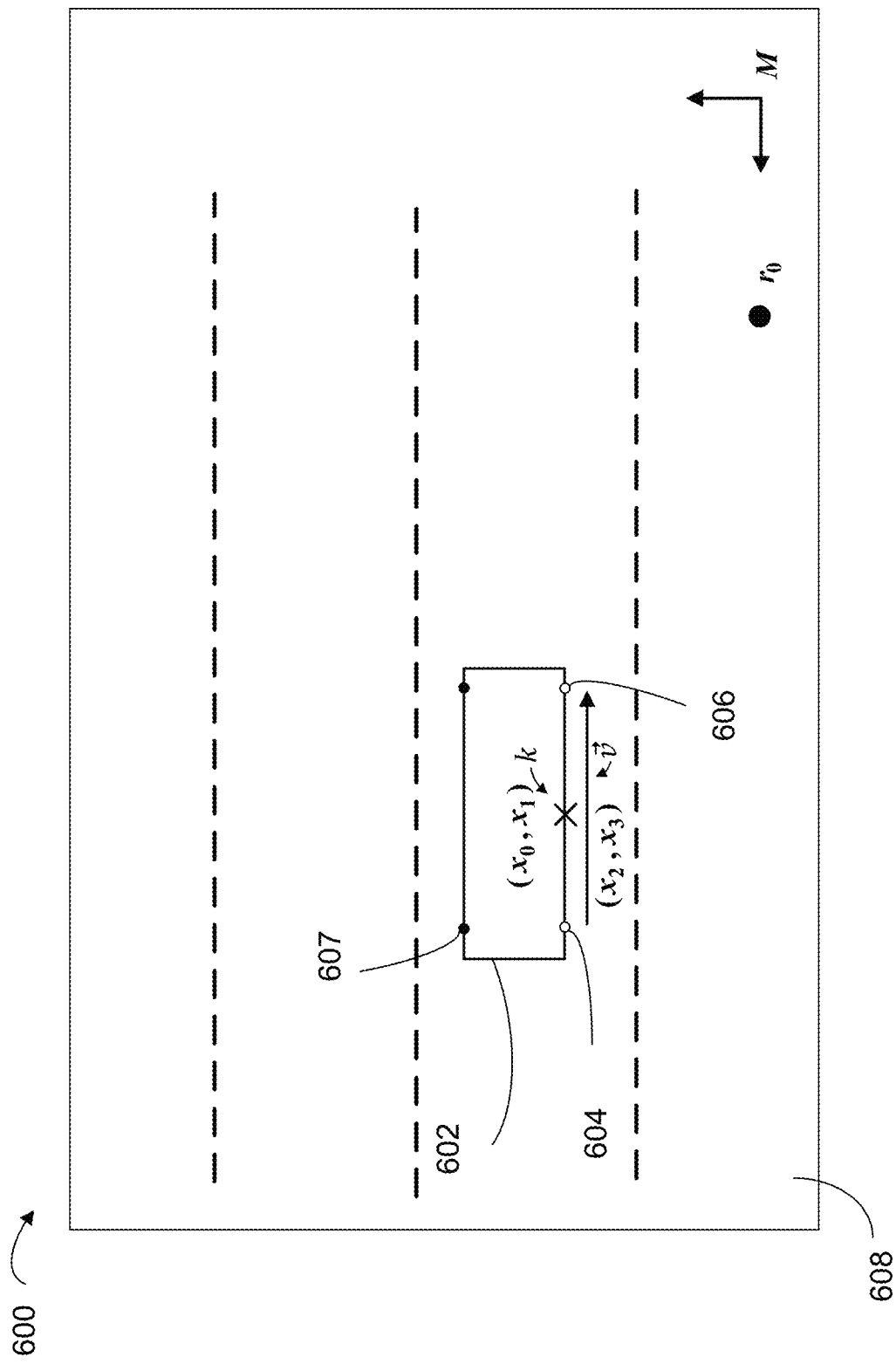
FIG. 6 is a bird's eye view diagram illustrating an example of a technique for determining 3D vehicle wheel positions for two visible wheels of a vehicle observed in a two-dimensional (2D) captured image, in accordance with some examples.

FIG. 6 illustrates an example of a target object (e.g., a target vehicle) that has two wheels observed in an image captured by a tracking object (e.g., by one or more cameras 202 of system 200 shown in FIG. 2). FIG. 6 illustrates a bird's eye view of an estimated position of target vehicle 602 within in a 3D map 600. The 3D map 600 can correspond to, or be generated from, the point map 207 shown in FIG. 2. As described with respect to FIG. 3A and FIG. 3B, the pixel positions of contact points between right rear wheel 604 and the road plane 608 and between the right front wheel 606 and the road plane 608 can be obtained from object detection on the captured image. In one illustrative example, the object detection can be performed by object detection engine 204 shown in FIG. 2. In the illustrated example of FIG. 6, the estimated 3D position of right rear wheel 604 can correspond to the 2D pixel position of wheel keypoint 306 shown in FIG. 3A and FIG. 3B. Similarly, the estimated 3D position of the right front wheel 606 can correspond to the 2D pixel position of wheel keypoint 308 shown in FIG. 3A and FIG. 3B. The pixel positions of wheel keypoint 306 and wheel keypoint 308 can be represented by pixel positions $p_i \in \mathbb{R}^2$, $i \in \{1,2\}$ in the 2D image plane.

In some cases, the road being traversed by the tracking vehicle and the target vehicle 602 can be represented by a road plane 608 (also referred to as a ground plane). In cases where the target vehicle 602 is traveling on a road, the positions of the right rear wheel 604 and the right front wheel 606 can be assumed to be located on the road plane 608. Since a plane is a 2D geometry, constraining the estimated 3D wheel positions to be located on the road plane 608 can reduce the number of unknowns that need to be solved to determine the 3D wheel positions. In some cases, the fact that wheels of a vehicle have a known geometry, such as a rectangle for cars or trucks or a line segment for motorcycles, can further simplify the problem of determining the 3D wheel positions.

In the case of two observed wheels 604, 606 of a four-wheeled vehicle (e.g., target vehicle 602) as shown in FIG. 6, the 3D positions of the two wheels can be represented as a line segment in the road plane 608 connecting the two observed wheels 604, 606. In one illustrative example, the line segment can be parametrized by two variables representing the mid-point of the line segment, one variable representing the length of the line segment, and one variable representing the orientation of the line segment on the plane. In some implementations, the length and orientation of the line segment can be represented as a vector between the two observed wheels.

In some implementations, the 3D positions of the two observed wheels 604, 606 can be determined by projecting rays passing through the center of the camera and through the 2D pixel position of the keypoints (e.g., keypoints 306, 308 shown in FIG. 3A and FIG. 3B) associated with a corresponding observed wheel/road plane contact point. In some cases, the 3D positions of the two observed wheels 604, 606 can be estimated as the intersection of a corresponding ray and the road plane 608. In the example of FIG. 6, each of the keypoints associated with the two observed wheels 604, 606 can have two corresponding 2D pixel coordinates (e.g., an x-coordinate and a y-coordinate, a height-coordinate and a width-coordinate, or the like) in the captured image, resulting in a total of four constraints for two observed wheels. As will be described in more detail below with respect to FIG. 6, various techniques can be used to determine (or estimate) 3D wheel positions of a target vehicle 602 using the 2D pixel positions of the wheel keypoints (e.g., keypoints 304, 306 shown in FIG. 3A and FIG. 3B) in a captured image of the target vehicle 602 on the road.

In one illustrative example implementation, the 3D positions of the two observed wheels 604, 606, can be calculated using an example non-linear least squares (NLS) technique as described below. In the example illustrated in FIG. 6, the road plane 608 can be represented by a point $r_0 \in \mathbb{R}^3$ on the road plane 608 (e.g., a reference point) and a normal vector $\vec{n} \in \mathbb{R}^3$ normal to the road plane 608. The matrix $M \in \mathbb{R}^3$ is a 3×2 matrix in the road plane 608 with orthonormal columns that are orthogonal to $\vec{n}$. The matrix M is a basis for the road plane 608, which is a 2D subspace of $\mathbb{R}^3$. With two observed wheels (e.g., right front wheel 606 and right rear wheel 604) as shown in FIG. 6 the 3D position of the two observed wheels can be constrained to form a line segment on the road plane 608. In some cases, the line segment can be characterized by the midpoint between the two wheels and a vector from a first one of the two observed wheels to a second one of the two observed wheels (e.g., a vector from the right rear wheel 604 to the right front wheel 606). The midpoint $k \in \mathbb{R}^3$ between the two wheels can be expressed as a point on the road plane 608 using two unknowns $x_0$, $x_1$ according to Equation (10) below:

$$k = r_0 + M \begin{bmatrix} x_0 \\ x_1 \end{bmatrix} \qquad (10)$$

where $x_0$ and $x_1$ are two of the four unknowns $x \in \mathbb{R}^4$ needed to define the line segment. In some cases, the other two unknowns $x_2$, $x_3$ can be expressed as a vector $\hat{v}$ (within the road plane 608 between the two wheels according to Equation (11) below:

$$\hat{v} = M \begin{bmatrix} x_2 \\ x_3 \end{bmatrix} \qquad (11)$$

An estimated 3D wheel point $\hat{r}_1$ of the first wheel of the two wheels (e.g., the right front wheel 606) and an estimated 3D wheel point $\hat{r}_2$ of the second wheel of the two wheels (e.g., the right rear wheel 604) can be represented as shown in Equation (12) and Equation (13):

$$\hat{r}_1 = k + \frac{1}{2}\vec{v} = r_0 + M\left(\begin{bmatrix} x_0 \\ x_1 \end{bmatrix} + \frac{1}{2}\begin{bmatrix} x_2 \\ x_3 \end{bmatrix}\right) \quad (12)$$

$$\hat{r}_2 = k - \frac{1}{2}\vec{v} = r_0 + M\left(\begin{bmatrix} x_0 \\ x_1 \end{bmatrix} - \frac{1}{2}\begin{bmatrix} x_2 \\ x_3 \end{bmatrix}\right) \quad (13)$$

In some implementations, the estimated 3D wheel points $\hat{r}_1$ and $\hat{r}_2$ can be reprojected onto the image plane in the camera coordinate system. In one illustrative example, a perspective projection as shown in Equation (14) and Equation (15) below can be used to project the estimated 3D points into the image plane, resulting in estimated pixel positions $\hat{p}_i$:

$$\hat{p}_{i,x} = \frac{\hat{r}_{i,x}}{\hat{r}_{i,z}} \quad (14)$$

$$\hat{p}_{i,y} = \frac{\hat{r}_{i,y}}{\hat{r}_{i,z}} \quad (15)$$

The 3D positions of the two observed wheels 604, 606 can be solved by minimizing a loss function using any suitable NLS solving technique. In one illustrative example, the loss function shown in Equation (16) below can be minimized via the Levenberg-Marquardt (also referred to as damped least-squares) algorithm.

$$\Sigma_i \|p_i - \hat{p}_i\|^2 \quad (16)$$

The Levenberg-Marquardt algorithm is an iterative technique that requires an initialization, such as an initial estimate of the 3D wheel positions. In some cases, the initial estimate can be the estimated 3D wheel positions provided by the LLS approach described below. The NLS technique can further refine the estimated 3D wheel positions by minimizing the reprojection error (e.g., minimizing the loss function of Equation 7).

As should be noted from the equations above, using the NLS technique allows for loosening a constraint on the direction vector between the two observed wheels, limiting the vector only to be constrained within the road plane 608 rather than assuming that the target object is moving parallel to a lane line (discussed in more detail below with respect to the LLS approach). As a result, the NLS technique described above can be used to determine the heading of target vehicles (also referred to as the yaw angle). In some cases, the NLS technique can also provide a maximum likelihood estimate of the 3D positions of the two observed wheels 604, 606.

In another illustrative example, the 3D positions of the two observed wheels 604 and 606 can be determined (or estimated) using a linear least squares (LLS) approach. As stated above, the two observed wheels 604, 606 can be assumed to be in contact with the road plane 608 and the 3D positions of the points of contact between the two observed wheels 604, 606 and the road plane 608 can be assumed to be on the road plane 608.

In one illustrative example implementation of an LLS approach, the 3D wheel positions of the observed wheels can be modeled using a midpoint between the wheels (e.g., point k shown in FIG. 6) and a vector between the first wheel and the second wheel, (e.g., vector $\vec{v}$ shown in FIG. 6). In some cases, four unknowns for the LLS approach can be modeled using Equation (10) for the midpoint between the two observed wheels 604, 606 and Equation (11) for the vector between the two observed wheels 604, 606.

In one illustrative example, the direction of the vector between two observed wheels 604, 606 (e.g., vector $\vec{v}$ shown in FIG. 6) can also be assumed to be known from the 3D map. For example, a map of the surroundings of the target vehicle (e.g., point map 207) can indicate a specific lane on a road in which the target vehicle is located. In such a case, the direction of motion of the target vehicle (e.g., the direction that the front of the target vehicle is pointing) can be assumed to match (or be parallel to) the lane direction. If the two observed wheels are the right rear wheel 604 and the right front wheel 606 as shown in the example of FIG. 6, then the direction of a vector between the right rear wheel 604 and right front wheel 606 can be parallel to the assumed direction of motion (i.e., the lane direction). On the other hand, if the two observed wheels are the left rear wheel 607 and the right rear wheel 606 (e.g., as shown with the keypoints 324, 326 in FIG. 3A and FIG. 3B), then the direction of a vector between the two observed wheels can be a vector that is orthogonal to the assumed direction of motion (i.e., the lane direction) and within the road plane 608.

The LLS approach can solve for the four unknowns by minimizing the difference between the estimate pixel positions projected from the estimated 3D wheel positions onto the image plane (e.g., $\hat{p}_i$ in Equation (16)) and the pixel positions in the captured image (e.g., $p_i$ in Equation (16)). The pixel positions $p_i$ for each of the two observed wheels 604, 606 can provide a total of four constraints (e.g., two coordinates per pixel). In some cases, the assumption that the direction vector between the two observed wheels 604, 606 can be determined from the 3D map provides an additional constraint on the solution for the 3D positions of the two observed wheels 604, 606. This assumption can also make the system of equations linear, thereby allowing for an LLS approach to be used for solving for the 3D positions of the two observed wheels 604, 606. Combining the four constraints from the pixel positions with the constraint on the direction of motion results in a total of five constraints (e.g., equations) for four unknowns. In one illustrative approach, a pseudoinverse (also known as a Moore-Penrose inverse) can provide a least squares solution to the system of linear equations with five equations and five unknowns.

In some cases, the LLS approach may not be able to provide a maximum likelihood estimate (MLE) of the 3D positions of the two observed wheels 604, 606 because there are more equations (or constraints) than there are unknowns. Also, in some situations, the assumption that the direction of motion of the vehicle is parallel to the lane in which the vehicle is driving may be incorrect, such as when a vehicle is changing lanes on a highway. In such an example, estimates of the 3D wheel positions using an LLS approach are likely to be inaccurate.

Figure 7:
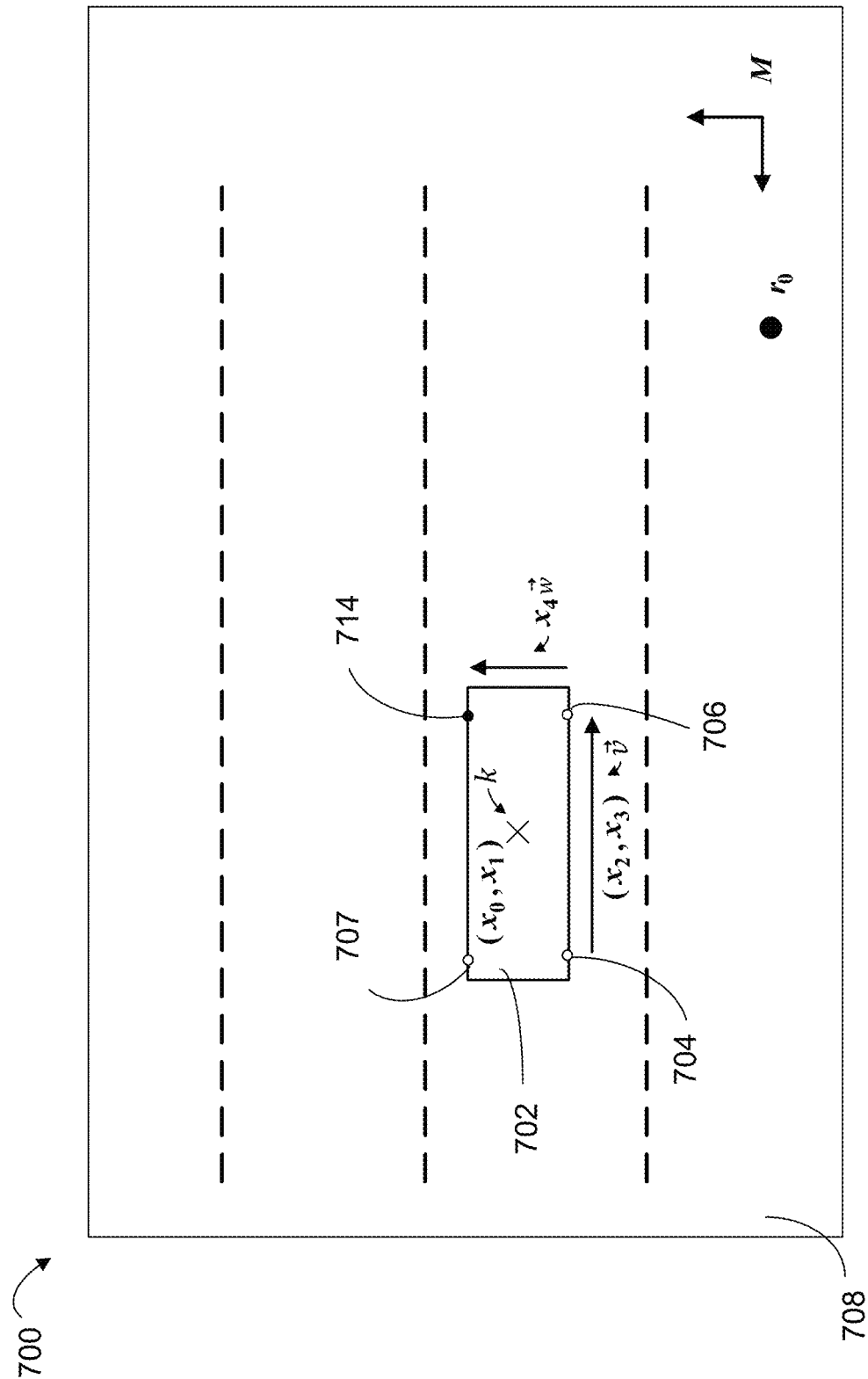
FIG. 7 is a bird's eye view diagram illustrating an example of a technique for determining 3D vehicle wheel positions for three or more visible wheels of a vehicle observed in a 2D captured image, in accordance with some examples.

FIG. 7 illustrates an example of a target object (e.g., a target vehicle) that has three wheels observed in an image captured by a tracking object (e.g., a tracking vehicle and/or a camera associated with a tracking vehicle). Similar to FIG. 6, FIG. 7 illustrates a bird's eye view of an estimated position of target vehicle 702 within in a 3D map 700. In the illustrated example of FIG. 7, the estimated 3D position of right rear wheel 704 can correspond to the 2D pixel position of keypoint 306 shown in FIG. 3A and FIG. 3B. Similarly, the estimated 3D position of the right front wheel 706 can correspond to the 2D pixel position of keypoint 308 shown in FIG. 3A and FIG. 3B. The estimated 3D position of the left rear wheel 707 can correspond to the 2D pixel position of keypoint 304 shown in FIG. 3A and FIG. 3B. The pixel positions of keypoint 306, keypoint 308, and keypoint 304 can be represented as $p_i \in \mathbb{R}^2$, $i \in \{1, 2, 3\}$ in the 2D image plane. As noted with respect to FIG. 6, the three observed wheels 704, 706, 707 can be assumed to be in contact with the road plane, and the 3D positions of the points of contact between the three observed wheels 704, 706, 707 can be assumed to be on the road plane 708.

In some cases, the road being traversed by the tracking vehicle and the target vehicle 702 can be represented by a road plane 708 (also referred to as a ground plane). In cases where the target vehicle 702 is traveling on a road, the positions of the right rear wheel 704, the right front wheel 706, and the left rear wheel 707 can be assumed to be located on the road plane 708. Since a plane is a 2D geometry, constraining the estimated 3D wheel positions to be located on the road plane 708 can reduce the number of unknowns that need to be solved to determine the 3D wheel positions. In some cases, the fact that wheels of a vehicle have a known geometry, such as a rectangle for cars or trucks or a line segment for motorcycles, can further simplify the problem of determining the 3D wheel positions.

In the case of three observed wheels 704, 706, 707 of a four-wheeled vehicle (e.g., target vehicle 702) as shown in FIG. 7, the 3D position of the three wheels can be represented as a rectangle in the road plane 708 formed by the three observed wheels 704, 706, 707 at three corners of the rectangle. In one illustrative example, the rectangle can be parametrized by two variables representing the mid-point of the rectangle, one variable representing the length of the long side of the rectangle, one variable representing the length of the short side of the rectangle, and one variable representing the orientation of the long side of the rectangle on the road plane 708. In some implementations, the length and orientation of the long side of the rectangle can be represented as a vector between a rear wheel (e.g., right rear wheel 704) and a front wheel (e.g., right front wheel 706) on the same side of the target vehicle 702.

In some implementations, the 3D position of the three observed wheels 704, 706, 707 can be determined by projecting rays passing through the center of the camera and through 2D pixel position of the keypoints (e.g., keypoints 304, 306, 308 shown in FIG. 3A and FIG. 3B) associated with a corresponding observed wheel/road plane contact point. In some cases, the 3D position of the three observed wheels 704, 706, 707 can be estimated as the intersection of a corresponding ray and the road plane 708. In the example of FIG. 7, each of the keypoints associated with the three observed wheels 704, 706, 707 can have two corresponding 2D pixel coordinates (e.g., an x-coordinate and a y-coordinate, a height-coordinate and a width-coordinate, or the like) in the captured image, resulting in a total of six constraints for three observed wheels. As will be described in more detail below with respect to FIG. 7, various techniques can be used to determine (or estimate) 3D wheel positions of a target vehicle 702 using the 2D pixel positions of the wheel keypoints (e.g., keypoints 304, 306 shown in FIG. 3A and FIG. 3B) in a captured image of the target vehicle 702 on the road.

In another illustrative example implementation, the 3D positions of the three observed wheels 704, 706, 707 can be calculated using an example NLS technique as described below. In the example illustrated in FIG. 7, the road plane 708 can be represented by a point $r_0 \in \mathbb{R}^3$ on the road plane 708 (e.g., a reference point) and a normal vector $\vec{n} \in \mathbb{R}^3$ normal to the road plane 708. The matrix $M \in \mathbb{R}^3$ is a 3×2 matrix in the road plane 708 with orthonormal columns that are orthogonal to n. The matrix M is a basis for the road plane 708, which is a 2D subspace of $\mathbb{R}^3$. With three observed wheels (e.g., right front wheel 706 and right rear wheel 704, and left rear wheel 707) as shown in FIG. 7 the 3D positions of the three observed wheels on the road plane 708 can be constrained to form a rectangle on the road plane 708. In some cases, the rectangle can be characterized by the midpoint of the rectangle, a vector from a first one the three observed wheels to a second one of the three observed wheels parallel to the orientation of the long side of the rectangle (e.g., a vector from the right rear wheel 704 to the right front wheel 706), and a length of the short side of the rectangle. In such an implementation, the orientation of the short side of the rectangle can be assumed to be orthogonal to the direction of the long side of the rectangle and the plane normal $\vec{n}$. The midpoint $k \in \mathbb{R}^3$ of the rectangle can be expressed as a point on the road plane 708 using two unknowns $x_0, x_1$ according to Equation (17) below:

$$k = r_0 + M \begin{bmatrix} x_0 \\ x_1 \end{bmatrix} \quad (17)$$

where $x_0$ and $x_1$ are two of the five unknowns $x \in \mathbb{R}^5$ needed to define the rectangle. In some cases, two additional unknowns $x_2, x_3$ can be expressed as a vector $\vec{v}$ within the road plane 708 between the two wheels along the long side of the rectangle (e.g., the right rear wheel 704 to the right front wheel 706) according to Equation (18) below:

$$\vec{v} = M \begin{bmatrix} x_2 \\ x_3 \end{bmatrix} \quad (18)$$

Finally, the length of the short side of the rectangle can be expressed as the unknown quantity $x_4$. In one example implementation, $x_4$ can be a scalar multiplier of a unit vector $\vec{w}$ orthogonal to $\vec{v}$ and orthogonal to the normal vector of the road plane. Estimated 3D wheel point $\hat{r}_1$ of the right rear wheel 704, estimated 3D wheel point $\hat{r}_2$ of the left rear wheel 707, and estimated 3D wheel point $\hat{r}_3$ of the right front wheel 706 can be represented as shown in Equation (19), Equation (20), and Equation (21), respectively.

$$\hat{r}_1 = k - \frac{1}{2}\vec{v} - \frac{1}{2}x_4 \vec{w} \quad (19)$$

$$\hat{r}_2 = k - \frac{1}{2}\vec{v} + \frac{1}{2}x_4 \vec{w} \quad (20)$$

$$\hat{r}_3 = k + \frac{1}{2}\vec{v} - \frac{1}{2}x_4 \vec{w} \quad (21)$$

In some implementations, the estimated 3D wheel points $\hat{r}_1, \hat{r}_2$, and $\hat{r}_3$ can be reprojected onto the image plane in the camera coordinate system. In one illustrative example, a perspective projection as shown in Equation (14) and Equation (15) above can be used to project the estimated 3D points into the image plane, resulting in estimated pixel positions $\hat{p}_i$.

In another illustrative example, the 3D positions of the three observed wheels 704, 706, 707 can be determined (or estimated) using an LLS approach. As stated above, the three observed wheels 704, 706, 707 can be assumed to be in contact with the road plane 708 and the 3D positions of the points of contact between the three observed wheels 704, 706, 707 and the road plane 708 can be assumed to be on the road plane 708.

In one illustrative example implementation of an LLS approach with three observed wheels 704, 706, 707, the 3D wheel positions of the observed wheels can be modeled using a midpoint between the wheels (e.g., point k shown in FIG. 7), a vector within the road plane 708 between the two wheels along the long side of the rectangle formed by the three observed wheels 704, 706, 707, (e.g., vector_$\vec{v}$ shown in FIG. 7), and an unknown corresponding to the width of the short side of the rectangle. In some cases, five unknowns for the LLS approach can be modeled using Equation (17) for the midpoint of the rectangle, Equation (18) for the vector between two observed wheels 704, 706 on the long side of the rectangle, and a scalar multiplier of a unit vector orthogonal to the vector between the two observed wheels 704, 706 on the long side of the rectangle and orthogonal to the normal vector normal to the road plane (e.g., normal vector $\vec{n}$ described above with respect to FIG. 6).

In one illustrative example, the direction of the vector between the two observed wheels 704, 706 on the long side of the rectangle (e.g., vector $\vec{v}$ shown in FIG. 7) can also be assumed to be known from the 3D map. For example, a map of the surroundings of the target vehicle (e.g., point map 207) can indicate a specific lane on a road in which the target vehicle is located. In such a case, the direction of motion of the target vehicle (e.g., the direction that the front of the target vehicle is pointing) can be assumed to match (or be parallel to) the lane direction. If the observed wheels are the right rear wheel 704 and the right front wheel 706 as shown in the example of FIG. 7, then the direction of the vector between the right rear wheel 704 and right front wheel 706 can be parallel to the assumed direction of motion (i.e., the lane direction). On the other hand, if the two observed wheels are the left rear wheel 707 and the right rear wheel 704 (e.g., as shown with the keypoints 324, 324 in FIG. 3A and FIG. 3B), then the direction of a vector between the two observed wheels can be orthogonal to the assumed direction of motion (i.e., the lane direction) and within the road plane 708.

The LLS approach can solve for the five unknowns to minimize the difference between the estimate pixel positions projected from the estimated 3D wheel positions onto the image plane (e.g., $\hat{p}_i$ in Equation (16)) and the pixel positions in the captured image (e.g., $p_i$ in Equation (16)). The pixel positions $p_i$ for each of the three observed wheels 704, 706, 707 can provide a total of six constraints (e.g., two coordinates per pixel). In some cases, the assumption that the direction vector can be determined from the 3D map provides one additional constraint on the solution for the 3D positions of the three observed wheels 704, 706, 707. This assumption can also make the system of equations linear, thereby allowing for an LLS approach to be used for solving for the 3D positions. In one illustrative approach, a pseudo-inverse (also known as a Moore-Penrose inverse) can provide a least squares solution to the system of linear equations with seven equations and five unknowns.

In some cases, the LLS approach may not be able to provide a maximum likelihood estimate (MLE) of the 3D positions of the three observed wheels 704, 706, 707 because there are more equations (or constraints) than there are unknowns. Also, in some situations, the assumption that the direction of motion of the vehicle is parallel to the lane in which the vehicle is driving may be incorrect, such as when a vehicle is changing lanes on a highway. In such an example, estimates of the 3D wheel positions using an LLS approach are likely to be inaccurate. As described above with respect to FIG. 6, in some cases, the estimated 3D wheel positions provided by the LLS approach can be used as an initial estimate for an NLS technique, which can in turn further refined the estimated 3D wheel positions.

The techniques described above with respect to FIG. 7 for three observed wheels 704, 706, 707 can also be used when a fourth wheel of a target vehicle 702 (e.g., left front wheel 714) is observed in an image captured by a tracking object (e.g., a tracking vehicle and/or a camera associated with a tracking vehicle). As noted above, the example techniques of solving for the 3D positions of three observed wheels 704, 706, 707 provides an estimate of the rectangle formed by all four wheels of the target vehicle 702 in the road plane 708. Having an additional 2D keypoint associated with the fourth wheel (e.g., wheel 714) can provide two additional measurements (e.g., equations) without increasing the number of unknowns since rectangle on the known plane can be fully defined by the five variables $x_0, x_1, x_2, x_3, x_4$ as described above. For example, extending the illustrative NLS example for three observed wheels 704, 706, 707 described above with respect to FIG. 7 to an example where the fourth wheel 714 was also observed, the unknowns can remain unchanged, but an additional estimated 3D position $\hat{r}_4$ of the left front wheel 714 can be represented as shown in Equation (22).

$$\hat{r}_4 = k + \frac{1}{2}\vec{v} + \frac{1}{2}x_4\vec{w} \tag{22}$$

Figure 8A:
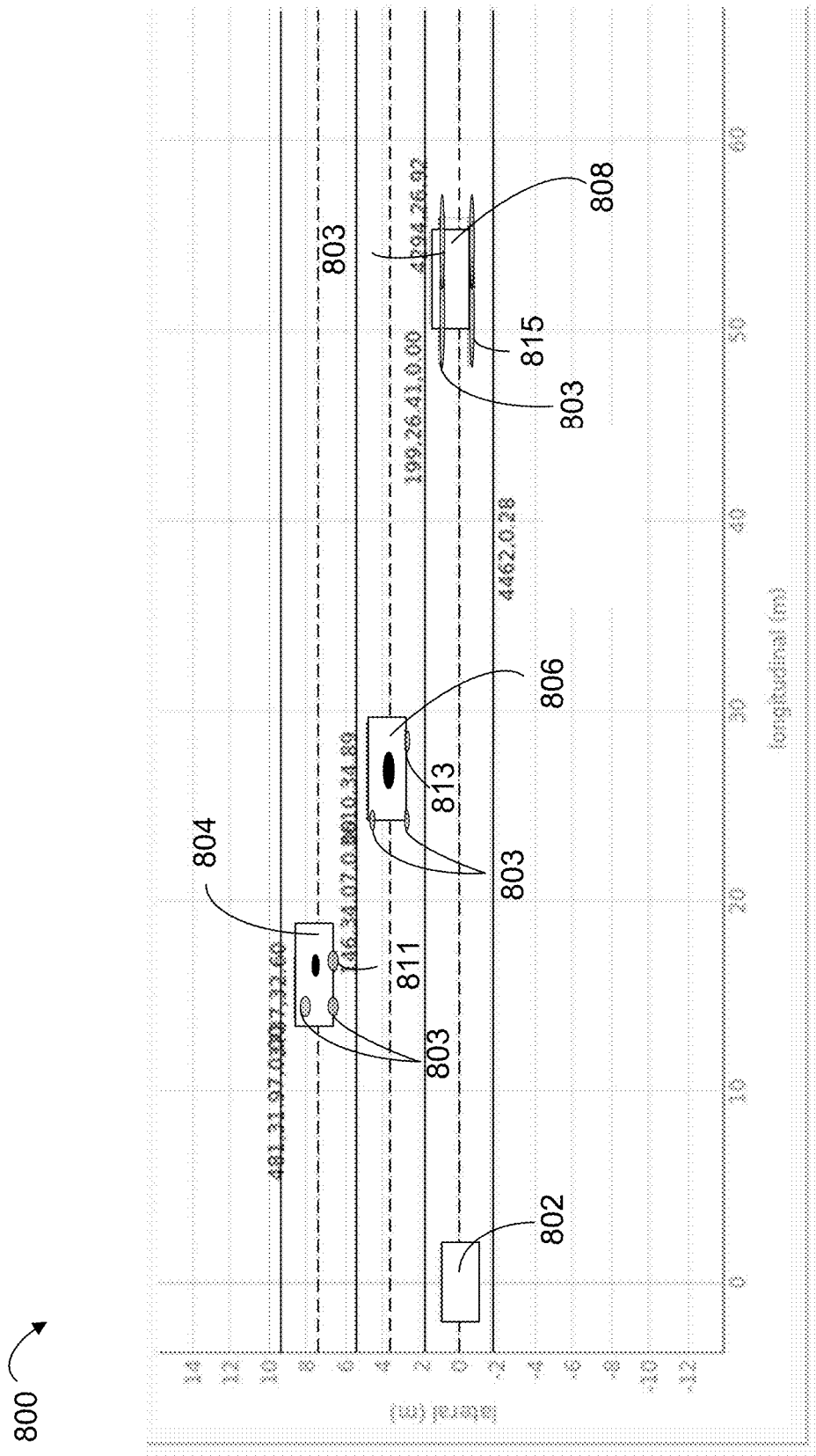
FIG. 8A and FIG. 8B are bird's eye view diagrams illustrating example results of techniques for determining 3D vehicle wheel positions, in accordance with some examples.

FIG. 8A illustrates an example bird's eye view 800 of a 3D map (e.g., point map 207) that includes 3D wheel position estimates 803 for a first target vehicle 804, a second target vehicle 806, and a third target vehicle 808. In the illustrated example, the tracking vehicle 802 (or ego vehicle) is located at the origin (0, 0) of the coordinate system. The horizontal axis represents a longitudinal distance from the tracking vehicle 802 and the vertical axis represents a lateral distance from the tracking vehicle 802. The ellipses shown at the positions of the 3D wheel position estimates 803 represent uncertainty of the 3D position of the wheel in the lateral and longitudinal directions. In the illustration of FIG. 8A, an example 3D wheel position 813 of the second target vehicle 806 and an example 3D wheel position 815 of the third target vehicle 808 exhibit relatively less lateral position uncertainty when compared with example 3D wheel position 811 of the first target vehicle 804. In addition, as shown in FIG. 8A, the example 3D wheel position 811 and example 3D wheel position 813 exhibit relatively less longitudinal position uncertainty when compared with example 3D wheel position 815. The example wheel positions and associated uncertainties shown in FIG. 8A can result when the wheel keypoint pixel positions produced by an object detection engine (e.g., object detection engine 204 shown in FIG. 2) that has a low noise (or uncertainty) of the position of the wheel keypoints (e.g., wheel keypoints 304, 306, 308, 324, 326 shown in FIG. 3A and FIG. 3B) in the 2D image captured by the tracking vehicle (or a camera associated with the target vehicle). For example, the illustrated example of FIG. 8A can correspond to a pixel position uncertainty σ equal to three pixels.

Referring back to the description of FIG. 6 and FIG. 7 and Equation (10) through Equation (21), pixel position uncertainty of the detected wheel keypoints in the 2D image (e.g., by object detection engine 204) can correspond to uncertainty of the estimated 3D wheel positions because the estimated 3D wheel positions are determined at least in part based on reprojecting the estimated 3D wheel positions onto the image plane and minimizing a difference between the reprojected pixel position and the pixel position of the wheel keypoints in the originally captured image.

Figure 8B:
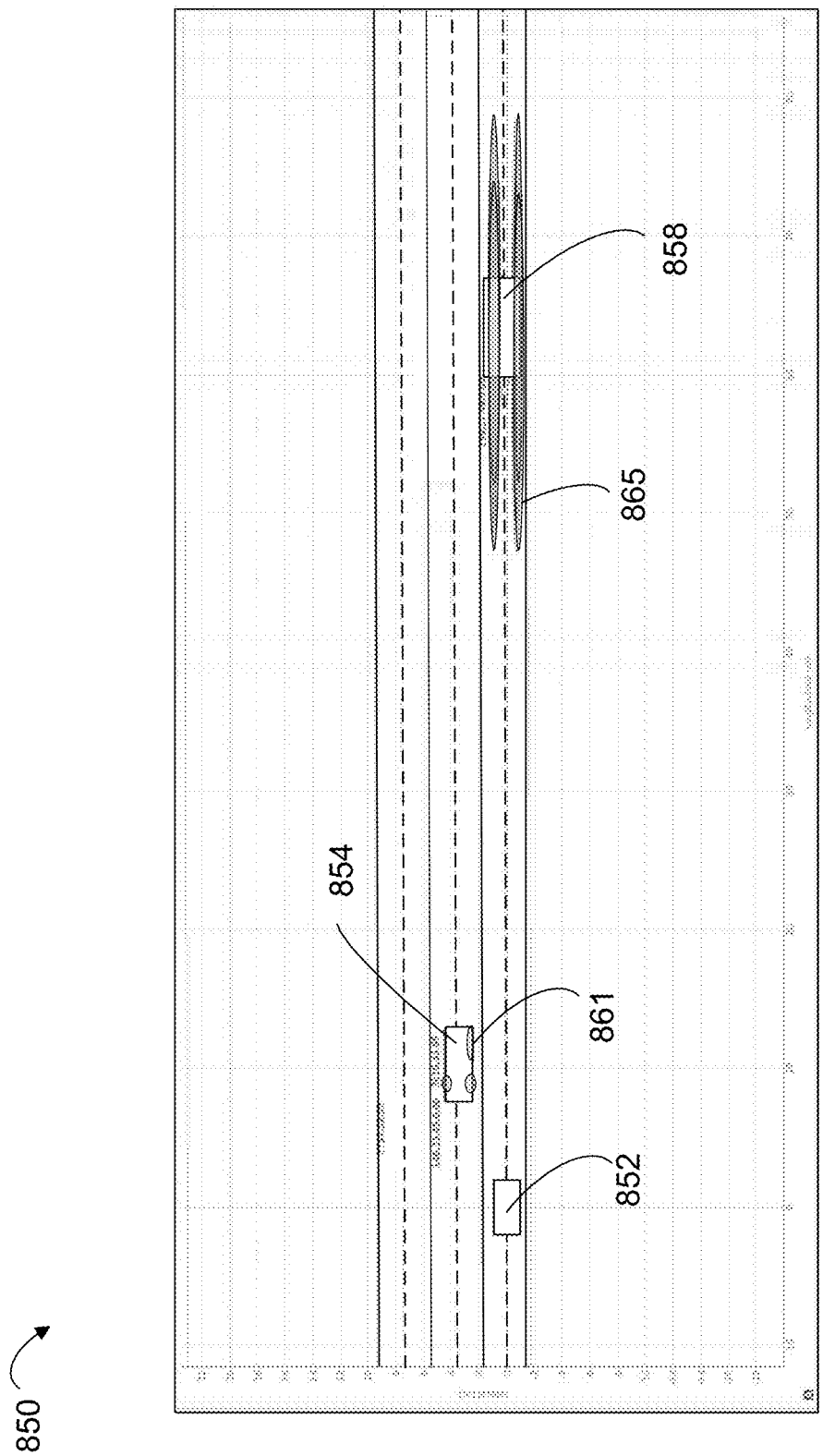

FIG. 8B illustrates an example bird's eye view 850 of a 3D map where the pixel position uncertainty σ equal to ten pixels. FIG. 8B illustrates a first target vehicle 854 and a second target vehicle 858 along with tracking vehicle 852 in the 3D map. As shown in FIG. 8B, the uncertainty in the longitudinal position of example 3D wheel position 865 of the second target vehicle 858 increases significantly when compared to example wheel 3D wheel position 811 of third target vehicle 808 shown in FIG. 8A as a result of the increased pixel position uncertainty (σ). Example estimated 3D wheel position 861 also exhibits increased uncertainty in both longitudinal and lateral position uncertainty when compared with similarly positioned (relative to the tracking vehicle 802) estimated 3D wheel position 811 shown in FIG. 8A. However, when comparing estimated 3D wheel position 861 and estimated wheel position 865, the longitudinal error in the estimated 3D wheel position 865 is larger than the longitudinal error of the estimated 3D wheel position 861 as a result of the greater longitudinal distance between the second target vehicle 858 and the tracking vehicle 852.

Table 1 and Table 2 below provide an illustrative example comparison between a 3D wheel position technique that independent estimates the position of each wheel shown in Table 2, and a 3D wheel position technique utilizing the geometry of the vehicle and a constraint that the vehicle wheels are on the road plane as described with respect to FIG. 6 and FIG. 7. Each table provides a distance traveled (in miles) during data collection as well as lateral position error (the numbers include the 95$^{th}$ percentile) for vehicles in the same lane as the tracking vehicle (e.g., the ego lane) and in front of the tracking vehicle, lateral position error for vehicles in a side lane (other than the ego lane), longitudinal position error for vehicles in the ego lane in front of the tracking vehicle, and longitudinal velocity error for vehicles in the ego lane in front of the tracking vehicle. The error values are all provided in meters.

In the illustrated example of Table 1, a naive reprojection estimation technique was used to individually determine the wheel positions of target vehicles using a reprojection technique. In the illustrated example of Table 2, an initial estimate of object 3D wheel positions was obtained using an LLS technique and the solution to the LLS technique was provided to a NLS regression for reducing reprojection error. Both the lateral position error for vehicles in a side lane and longitudinal position error for vehicles in the error lane showed improvement as a result of utilizing the vehicle geometry and road plane constraints to improve the wheel position estimation as described herein.

TABLE 1

| Case | Distance Traveled (miles) | Lateral Position Error Ego Lane (Front) | Lateral Position Error Side Lane (Front) | Longitudinal Position Error Ego Lane (Front) | Longitudinal Velocity Error Ego Lane (Front) |
|---|---|---|---|---|---|
| TOTAL | 14 | 0.28 | −0.56 | 3.02 | 1.37 |

TABLE 2

| Case | Distance Traveled (miles) | Lateral Position Error Ego Lane (Front) | Lateral Position Error Side Lane (Front) | Longitudinal Position Error Ego Lane (Front) | Longitudinal Velocity Error Ego Lane (Front) |
|---|---|---|---|---|---|
| TOTAL | 14 | 0.29 | −0.32 | 2.74 | 1.37 |

In some cases, an estimate for the pixel position uncertainty σ of the keypoint can be determined in parallel with estimating the 3D wheel positions using the techniques described with respect to FIG. 6 and FIG. 7. In some cases, a linear least square approach allows for an analytical determination of the pixel position. LLS is a closed form solution and thus allows computation of the estimated sigmas σ as a function of measurement noise of the inputs. Accordingly, in some implementations, an estimate of the 3D wheel positions can be performed using a linear least squares technique to provide both an estimated pixel uncertainty σ and an initial condition for performing a non-linear least squares regression.

Figure 9:
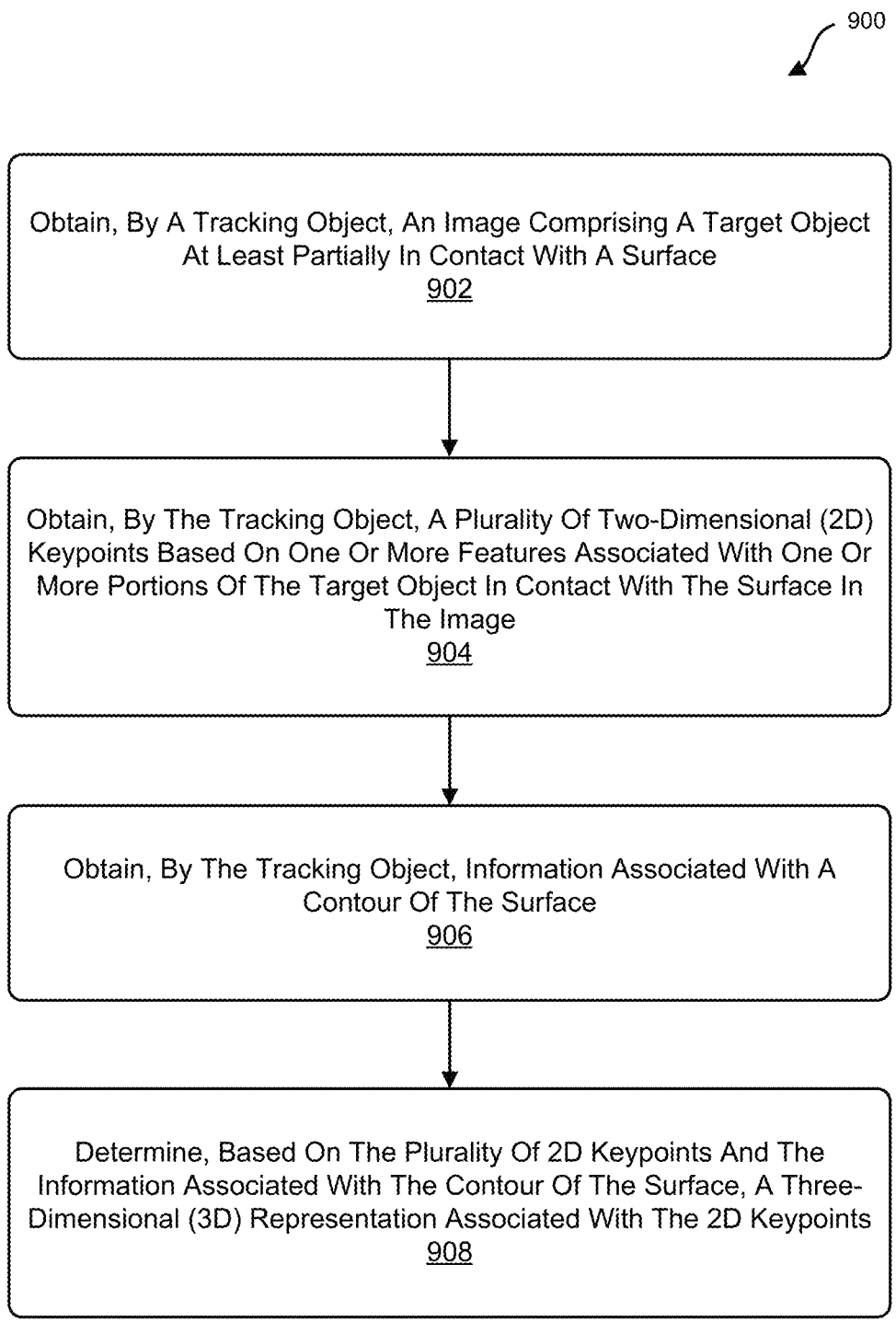
FIG. 9 is a flowchart illustrating an example of a process for performing object detection and tracking using the techniques described herein, in accordance with some examples.

FIG. 9 is a flow diagram illustrating an example of a process 900 for performing object detection and tracking, according to some aspects of the disclosed technology. At block 902, the process 900 includes obtaining, by a tracking object, an image comprising a target object at least partially in contact with a surface. In one illustrative example, the target object includes a vehicle and the surface includes a road, such as that shown in FIG. 3A.

At block 904, the process includes obtaining, by the tracking object, a plurality of two-dimensional (2D) keypoints based on one or more features associated with one or more portions of the target object in contact with the surface in the image. In the illustrative example note above with the target object including the vehicle and the surface including a road, the plurality of 2D keypoints may include contact points between wheels of the vehicle and the road in the image.

At block 906, the process includes obtaining, by the tracking object, information associated with a contour of the surface. In the illustrative example note above with the target object including the vehicle and the surface including a road, the information associated with the contour of the surface can include a plane associated with the road.

At block 908, the process includes determining, by the tracking object based on the plurality of 2D keypoints and the information associated with the contour of the surface, a three-dimensional (3D) representation associated with the plurality of 2D keypoints.

In some examples, a first 2D keypoint of the plurality of 2D keypoints includes a first pixel position in the image, and a second 2D keypoint of the plurality of 2D keypoints includes a second pixel position in the image. For instance, as described herein, in some cases two 2D keypoints are visible in an image captured or otherwise obtained by a tracking object. For instance, as shown in FIG. 6, two wheels are observed in an image captured by a tracking object. In some aspects, to determine the 3D representation associated with the plurality of 2D keypoints, the process 900 can include determining a 3D line segment joining a first 3D representation of the first 2D keypoint and a second 3D representation of the second 2D keypoint. In such aspects, the information associated with the contour of the surface can include a plane associated with the surface and the 3D line segment is constrained to be included in the plane. In some cases, to determine the 3D line segment, the process 900 can include determining estimated parameters of the 3D line segment. In some examples, the estimated parameters of the 3D line segment can include a mid-point of the 3D line segment, a length of the 3D line segment, an orientation of the 3D line segment, any combination thereof, and/or other parameters. In some aspects, the orientation of the 3D line segment is determined based on an orientation of a lane on a road. For instance, referring to FIG. 6 as an illustrative example, the 3D positions of the two wheels observed in the image can be represented as a line segment in the road plane 608 connecting the two observed wheels 604, 606. The line segment can be parametrized by two variables representing the mid-point of the line segment, one variable representing the length of the line segment, and one variable representing the orientation of the line segment on the plane. In some implementations, the length and orientation of the line segment can be represented as a vector between the two observed wheels.

In some cases, after determining the 3D line segment, the process 900 can include projecting the first 3D representation of the first 2D keypoint onto a first projected pixel position in the image and projecting the second 3D representation of the second 2D keypoint onto a second projected pixel position in the image. Referring to FIG. 6 as an illustrative example, the tracking vehicle can project rays passing through the center of the camera and through the 2D pixel position of the keypoints (e.g., keypoints 306, 308 shown in FIG. 3A and FIG. 3B) associated with a corresponding observed wheel/road plane contact point. The process 900 can include determining a projection error based on a first difference between the first projected pixel position and the first pixel position, a second difference between the second projected pixel position and the second pixel position, or both. The process 900 can further include minimizing the projection error by adjusting the first 3D representation of the first 2D keypoint, the second 3D representation of the second 2D keypoint, or both. In some examples, to minimize the projection error, the process 900 can include determining a least squares solution for the projection error. In some cases, to determine the least squares solution, the process 900 can include determining a linear least squares solution. In some cases, to determine the least squares solution, the process 900 can include determining a non-linear least squares regression, as described above with respect to FIG. 6 as an illustrative example. In some examples, an initial estimate provided for determining the non-linear least squares regression includes a linear least squares regression. For instance, as described above with respect to FIG. 6 as an illustrative example, an initial estimate of 3D wheel positions can be the estimated 3D wheel positions provided by the LLS approach described herein.

In some examples, a first 2D keypoint of the plurality of 2D keypoints includes a first pixel position in the image, a second 2D keypoint of the plurality of 2D keypoints includes a second pixel position in the image, and a third 2D keypoint of the plurality of 2D keypoints includes a third pixel position in the image. For instance, as described herein, in some cases three 2D keypoints are visible in an image captured or otherwise obtained by a tracking object. For instance, as shown in FIG. 7, three wheels are observed in an image captured by a tracking object. In some cases, to determine the 3D representation associated with the plurality of 2D keypoints, the process 900 can include determining a 3D rectangle formed by a first 3D representation of the first 2D keypoint, a second 3D representation of the second 2D keypoint, and a third 3D representation of the third 2D keypoint. In such aspects, the information associated with the contour of the surface can include a plane associated with the surface and the 3D rectangle is constrained to be included in the plane. In some examples, to determine the 3D rectangle, the process 900 can include determining estimated parameters of the 3D rectangle. In some cases, the estimated parameters of the 3D rectangle include a mid-point of the 3D rectangle, a length of a long side of the 3D rectangle, a length of a short side of the 3D rectangle, an orientation of the 3D rectangle, any combination thereof, and/or other parameters. In some aspects, the orientation of the 3D rectangle is determined based on an orientation of a lane on a road. For instance, referring to FIG. 7 as an illustrative example, the 3D position of the three wheels can be represented as a rectangle in the road plane 708 formed by the three observed wheels 704, 706, 707 at three corners of the rectangle. The rectangle can be parametrized by two variables representing the mid-point of the rectangle, one variable representing the length of the long side of the rectangle, one variable representing the length of the short side of the rectangle, and one variable representing the orientation of the long side of the rectangle on the road plane 708. In some implementations, the length and orientation of the long side of the rectangle can be represented as a vector between a rear wheel (e.g., right rear wheel 704) and a front wheel (e.g., right front wheel 706) on the same side of the target vehicle 702.

In some aspects, after determining the 3D rectangle, the process 900 can include projecting the first 3D representation of the first 2D keypoint onto a first projected pixel position in the image, projecting the second 3D representation of the second 2D keypoint onto a second projected pixel position in the image, and projecting the third 3D representation of the third 2D keypoint onto a third projected pixel position. Referring to FIG. 7 as an illustrative example, the tracking vehicle can project rays passing through the center of the camera and through 2D pixel position of the keypoints (e.g., keypoints 304, 306, 308 shown in FIG. 3A and FIG. 3B) associated with a corresponding observed wheel/road plane contact point. The process 900 can include determining a projection error based on at least one of a first difference between the first projected pixel position and the first pixel position, a second difference between the second projected pixel position and the second pixel position, and a third difference between the third projected pixel position and the third pixel position. The process 900 can further include minimizing the projection error by adjusting at least one of the first 3D representation of the first 2D keypoint, the second 3D representation of the second 2D keypoint, and the third 3D representation of the third 2D keypoint. In some examples, to minimize the projection error, the process 900 can include determining a least squares solution for the projection error. In some cases, the least squares solution includes a linear least squares solution. In some examples, to determine the least squares solution, the process 900 can include determining a non-linear least squares regression, as described above with respect to FIG. 7 as an illustrative example. In some aspects, an initial estimate provided for determining the non-linear least squares regression includes a linear least squares estimate. For instance, as described above with respect to FIG. 6 and FIG. 7 as an illustrative example, an initial estimate of 3D wheel positions can be the estimated 3D wheel positions provided by the LLS approach described herein.

In some examples, the processes described herein (e.g., process 900 and/or other process described herein) may be performed by a computing device or apparatus (e.g., a vehicle computer system). In one example, the process 900 can be performed by the system 200 shown in FIG. 2. In another example, the process 900 can be performed by a computing device with the computing system 1400 shown in FIG. 14. For instance, a vehicle with the computing architecture shown in FIG. 14 can include the components of system 200 shown in FIG. 2 and can implement the operations of process 900 shown in FIG. 9.

The computing device can include any suitable device, such as a vehicle or a computing device of a vehicle (e.g., a driver monitoring system (DMS) of a vehicle), a mobile device (e.g., a mobile phone), a desktop computing device, a tablet computing device, a wearable device (e.g., a VR headset, an AR headset, AR glasses, a network-connected watch or smartwatch, or other wearable device), a server computer, a robotic device, a television, and/or any other computing device with the resource capabilities to perform the processes described herein, including the process 900 and/or other process described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The process 900 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 900 and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 10:
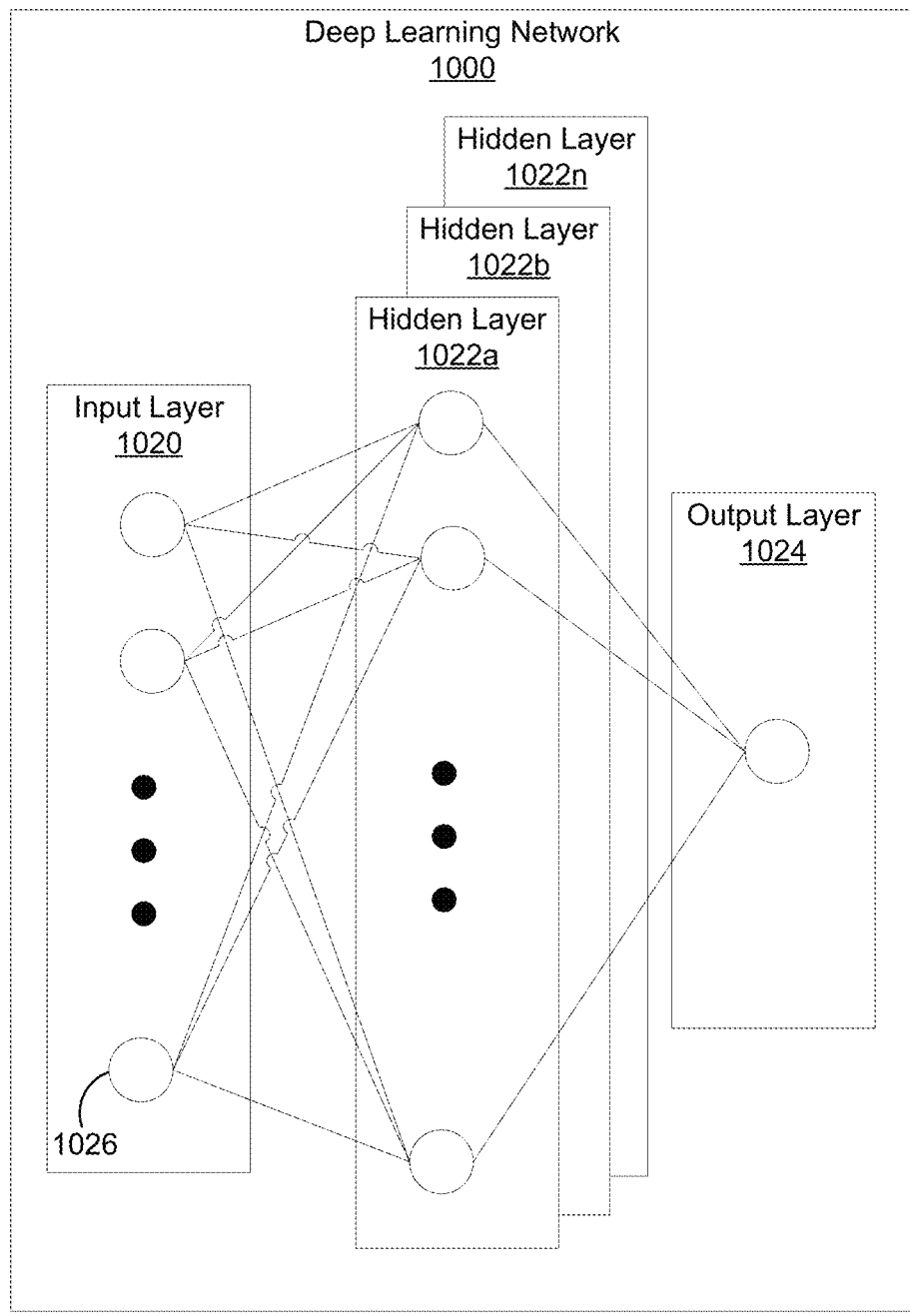
FIG. 10 a block diagram illustrating an example of a deep neural network, in accordance with some examples.

As noted above, the object detection and tracking system can use a machine-learning based object detector (e.g., based on a deep neural network) to perform object detection. FIG. 10 is an illustrative example of a deep neural network 1000 that can be used to perform object detection on an image containing a target object, such as target vehicle 303 located in image 300, as discussed above. Deep neural network 1000 includes an input layer 1020 that is configured to ingest input data, such as pre-processed (scaled) sub-images that contain a target object for which detection is to be performed. In one illustrative example, the input layer 1020 can include data representing the pixels of an input image or video frame. The neural network 1000 includes multiple hidden layers 1020*a*, 1020*b*, through 1020*n*. The hidden layers 1020*a*, 1020*b*, through 1020*n* include "n" number of hidden layers, where "n" is an integer greater than or equal to one. The number of hidden layers can be made to include as many layers as needed for the given application. The neural network 1000 further includes an output layer 1024 that provides an output resulting from the processing performed by the hidden layers 1020*a*, 1020*b*, through 1020*n*. In one illustrative example, the output layer 1024 can provide a classification for an object in an image or input video frame. The classification can include a class identifying the type of object (e.g., a person, a dog, a cat, or other object).

The neural network 1000 is a multi-layer neural network of interconnected nodes. Each node can represent a piece of information. Information associated with the nodes is shared among the different layers and each layer retains information as information is processed. In some cases, the neural network 1000 can include a feed-forward network, in which case there are no feedback connections where outputs of the network are fed back into itself. In some cases, the neural network 1000 can include a recurrent neural network, which can have loops that allow information to be carried across nodes while reading in input.

Information can be exchanged between nodes through node-to-node interconnections between the various layers. Nodes of the input layer 1020 can activate a set of nodes in the first hidden layer 1020*a*. For example, as shown, each of the input nodes of the input layer 1020 is connected to each of the nodes of the first hidden layer 1020*a*. The nodes of the hidden layers 1020*a*, 1020*b*, through 1020*n* can transform the information of each input node by applying activation functions to this information. The information derived from the transformation can then be passed to and can activate the nodes of the next hidden layer 1020*b*, which can perform their own designated functions. Example functions include convolutional, up-sampling, data transformation, and/or any other suitable functions. The output of the hidden layer 1020*b* can then activate nodes of the next hidden layer, and so on. The output of the last hidden layer 1020*n* can activate one or more nodes of the output layer 1024, at which an output is provided. In some cases, while nodes (e.g., node 1026) in the neural network 1000 are shown as having multiple output lines, a node has a single output and all lines shown as being output from a node represent the same output value.

In some cases, each node or interconnection between nodes can have a weight that is a set of parameters derived from the training of the neural network 1000. Once the neural network 1000 is trained, it can be referred to as a trained neural network, which can be used to classify one or more objects. For example, an interconnection between nodes can represent a piece of information learned about the interconnected nodes. The interconnection can have a tunable numeric weight that can be tuned (e.g., based on a training dataset), allowing the neural network 1000 to be adaptive to inputs and able to learn as more and more data is processed.

The neural network 1000 is pre-trained to process the features from the data in the input layer 1020 using the different hidden layers 1020a, 1020b, through 1020n in order to provide the output through the output layer 1024. In an example in which the neural network 1000 is used to identify objects in images, the neural network 1000 can be trained using training data that includes both images and labels. For instance, training images can be input into the network, with each training image having a label indicating the classes of the one or more objects in each image (basically, indicating to the network what the objects are and what features they have). In one illustrative example, a training image can include an image of a number 2, in which case the label for the image can be [0 0 1 0 0 0 0 0 0 0].

In some cases, the neural network 1000 can adjust the weights of the nodes using a training process called backpropagation. Backpropagation can include a forward pass, a loss function, a backward pass, and a weight update. The forward pass, loss function, backward pass, and parameter update is performed for one training iteration. The process can be repeated for a certain number of iterations for each set of training images until the neural network 1000 is trained well enough so that the weights of the layers are accurately tuned.

For the example of identifying objects in images, the forward pass can include passing a training image through the neural network 1000. The weights are initially randomized before the neural network 1000 is trained. The image can include, for example, an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

For a first training iteration for the neural network 1000, the output will likely include values that do not give preference to any particular class due to the weights being randomly selected at initialization. For example, if the output is a vector with probabilities that the object includes different classes, the probability value for each of the different classes may be equal or at least very similar (e.g., for ten possible classes, each class may have a probability value of 0.1). With the initial weights, the neural network 1000 is unable to determine low level features and thus cannot make an accurate determination of what the classification of the object might be. A loss function can be used to analyze error in the output. Any suitable loss function definition can be used. One example of a loss function includes a mean squared error (MSE). The MSE is defined as $E_{total} = \sum \frac{1}{2}(\text{target}-\text{output})^2$, which calculates the sum of one-half times the actual answer minus the predicted (output) answer squared. The loss can be set to be equal to the value of $E_{total}$.

The loss (or error) will be high for the first training images since the actual values will be much different than the predicted output. The goal of training is to minimize the amount of loss so that the predicted output is the same as the training label. The neural network 1000 can perform a backward pass by determining which inputs (weights) most contributed to the loss of the network, and can adjust the weights so that the loss decreases and is eventually minimized.

A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $$w = w_i - \eta \frac{dL}{dW},$$

where w denotes a weight, $w_i$, denotes the initial weight, and η denotes a learning rate. The learning rate can be set to any suitable value, with a high learning rate including larger weight updates and a lower value indicating smaller weight updates.

The neural network 1000 can include any suitable deep network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. The neural network 1000 can include any other deep network other than a CNN, such as an autoencoder, a deep belief nets (DBNs), a Recurrent Neural Networks (RNNs), among others.

Figure 11:
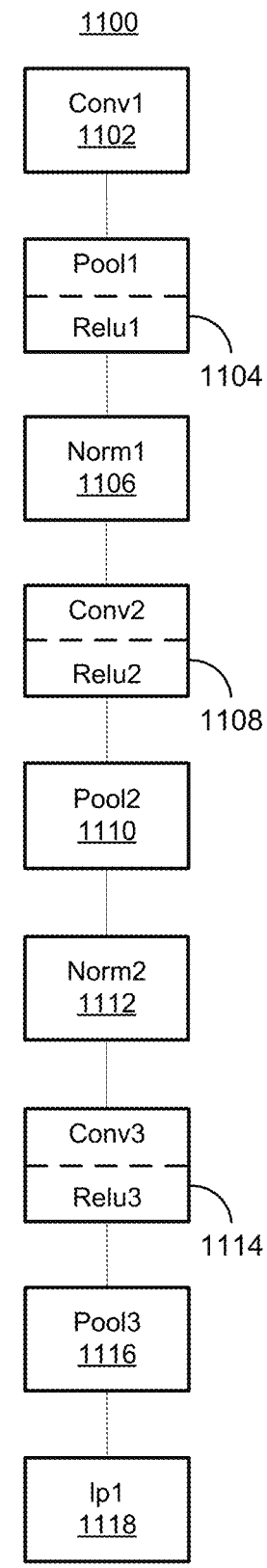
FIG. 11 is a diagram illustrating an example of the Cifar-10 neural network, in accordance with some examples.

FIG. 11 is a diagram illustrating an example of the Cifar-10 neural network 1100. In some cases, the Cifar-10 neural network can be trained to classify specific objects, such as vehicles only. As shown, the Cifar-10 neural network 1100 includes various convolutional layers (Conv1 layer 1102, Conv2/Relu2 layer 1108, and Conv3/Relu3 layer 1114), numerous pooling layers (Pool1/Relu1 layer 1104, Pool2 layer 1110, and Pool3 layer 1116), and rectified linear unit layers mixed therein. Normalization layers Norm1 1106 and Norm2 1112 are also provided. A final layer is the ip1 layer 1118.

Another deep learning-based detector that can be used to detect or classify objects in images includes the SSD detector, which is a fast single-shot object detector that can be applied for multiple object categories or classes. Traditionally, the SSD model is designed to use multi-scale convolutional bounding box outputs attached to multiple feature maps at the top of the neural network. Such a representation allows the SSD to efficiently model diverse box shapes, such as when the size of an object is unknown in a given image. However, using the systems and techniques described herein, the sub-image extraction and the width and/or height scaling of the sub-image can allow an object detection and tracking system to avoid having to work with diverse box shapes. Rather, the object detection model of the detection and tracking system can perform object detection on the scaled image in order to detect the position and/or location of the object (e.g., a target vehicle) in the image.

Figure 12A:
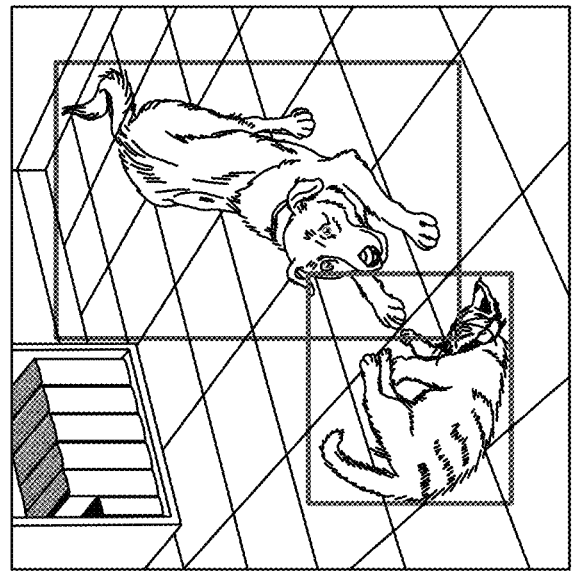
FIG. 12A through FIG. 12C are diagrams illustrating an example of a single-shot object detector, in accordance with some examples.
Figure 12B:
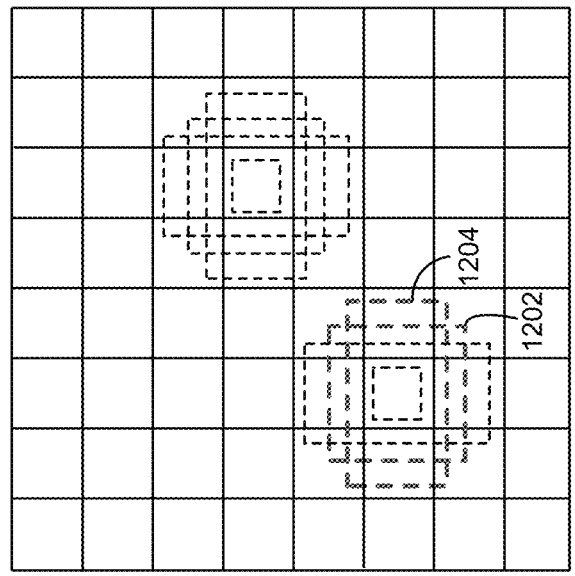
Figure 12C:
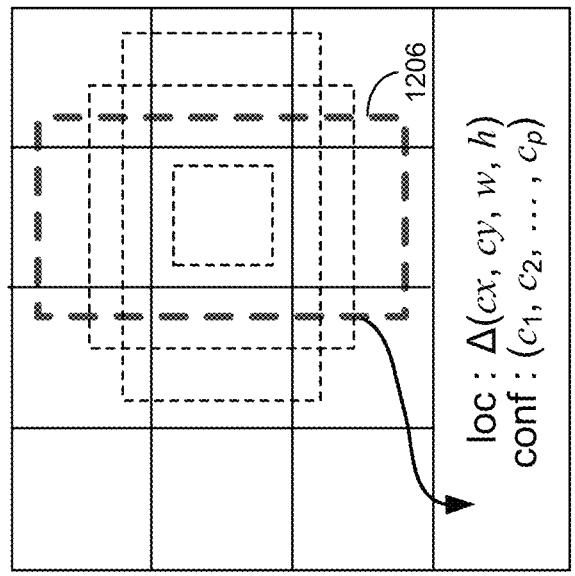

FIG. 12A-FIG. 12C are diagrams illustrating an example of a single-shot object detector that models diverse box shapes. FIG. 12A includes an image and FIG. 12B and FIG. 12C include diagrams illustrating how an SSD detector (with the VGG deep network base model) operates. For example, SSD matches objects with default boxes of different aspect ratios (shown as dashed rectangles in FIG. 12B and FIG. 12C). Each element of the feature map has a number of default boxes associated with it. Any default box with an intersection-over-union with a ground truth box over a threshold (e.g., 0.4, 0.5, 0.6, or other suitable threshold) is considered a match for the object. For example, two of the 8×8 boxes (box 1202 and box 1204 in FIG. 12B) are matched with the cat, and one of the 4×4 boxes (box 1206 in FIG. 12C) is matched with the dog. SSD has multiple features maps, with each feature map being responsible for a different scale of objects, allowing it to identify objects across a large range of scales. For example, the boxes in the 8×8 feature map of FIG. 12B are smaller than the boxes in the 4×4 feature map of FIG. 12C. In one illustrative example, an SSD detector can have six feature maps in total.

For each default box in each cell, the SSD neural network outputs a probability vector of length c, where c is the number of classes, representing the probabilities of the box containing an object of each class. In some cases, a background class is included that indicates that there is no object in the box. The SSD network also outputs (for each default box in each cell) an offset vector with four entries containing the predicted offsets required to make the default box match the underlying object's bounding box. The vectors are given in the format (cx, cy, w, h), with cx indicating the center x, cy indicating the center y, w indicating the width offsets, and h indicating height offsets. The vectors are only meaningful if there actually is an object contained in the default box. For the image shown in FIG. 12A, all probability labels would indicate the background class with the exception of the three matched boxes (two for the cat, one for the dog).

As noted above, using the systems and techniques described herein, the number of scales is reduced to the scaled sub-image, upon which an object detection model can perform object detection to detect the position of an object (e.g., a target vehicle).

Figure 13C:
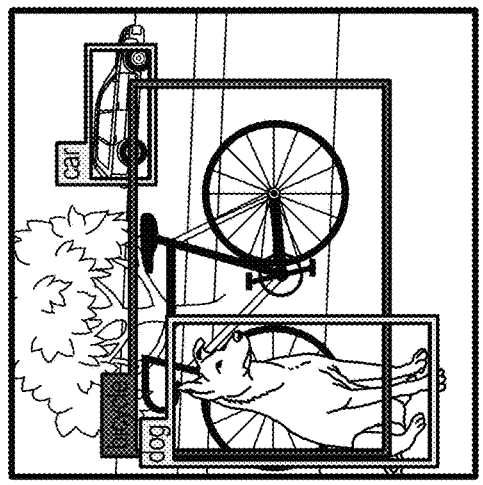
FIG. 13A through FIG. 13C are diagrams illustrating an example of a You Only Look Once (YOLO) detector, in accordance with some examples.
Figure 13B:
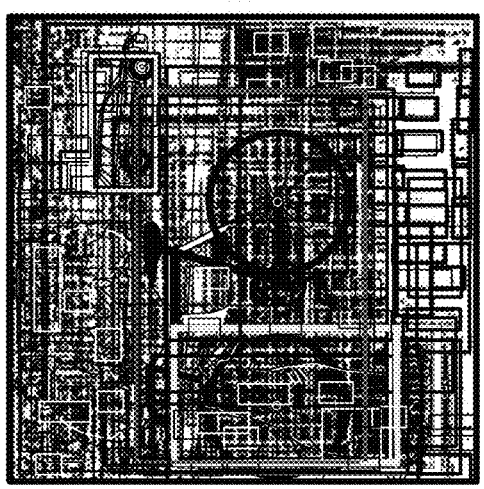
Figure 13A:
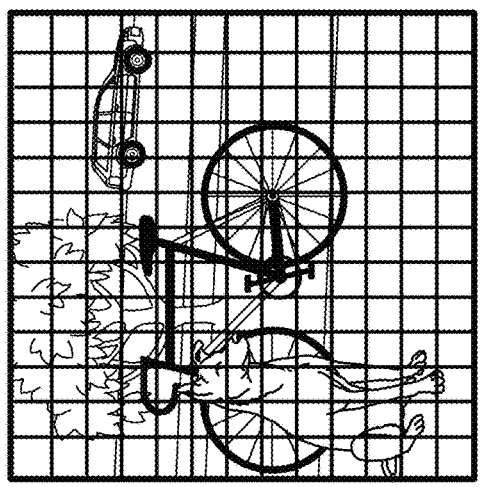

Another deep learning-based detector that can be used by an object detection model to detect or classify objects in images includes the You only look once (YOLO) detector, which is an alternative to the SSD object detection system. FIG. 13A through FIG. 13C are diagrams illustrating an example of a you only look once (YOLO) detector, in accordance with some examples. In particular, FIG. 13A includes an image and FIG. 13B and FIG. 13C include diagrams illustrating how the YOLO detector operates. The YOLO detector can apply a single neural network to a full image. As shown, the YOLO network divides the image into regions and predicts bounding boxes and probabilities for each region. These bounding boxes are weighted by the predicted probabilities. For example, as shown in FIG. 13A, the YOLO detector divides the image into a grid of 13-by-13 cells. Each of the cells is responsible for predicting five bounding boxes. A confidence score is provided that indicates how certain it is that the predicted bounding box actually encloses an object. This score does not include a classification of the object that might be in the box, but indicates if the shape of the box is suitable. The predicted bounding boxes are shown in FIG. 13B. The boxes with higher confidence scores have thicker borders.

Each cell also predicts a class for each bounding box. For example, a probability distribution over all the possible classes is provided. Any number of classes can be detected, such as a bicycle, a dog, a cat, a person, a car, or other suitable object class. The confidence score for a bounding box and the class prediction are combined into a final score that indicates the probability that that bounding box contains a specific type of object. For example, the gray box with thick borders on the left side of the image in FIG. 13B is 85% sure it contains the object class "dog." There are 169 grid cells (13×13) and each cell predicts 5 bounding boxes, resulting in 1745 bounding boxes in total. Many of the bounding boxes will have very low scores, in which case only the boxes with a final score above a threshold (e.g., above a 30% probability, 40% probability, 50% probability, or other suitable threshold) are kept. FIG. 13C shows an image with the final predicted bounding boxes and classes, including a dog, a bicycle, and a car. As shown, from the 1745 total bounding boxes that were generated, only the three bounding boxes shown in FIG. 13C were kept because they had the best final scores.

In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, one or more network interfaces configured to communicate and/or receive the data, any combination thereof, and/or other component(s). The one or more network interfaces can be configured to communicate and/or receive wired and/or wireless data, including data according to the 3G, 4G, 5G, and/or other cellular standard, data according to the WiFi (802.11x) standards, data according to the Bluetooth™ standard, data according to the Internet Protocol (IP) standard, and/or other types of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

Figure 14:
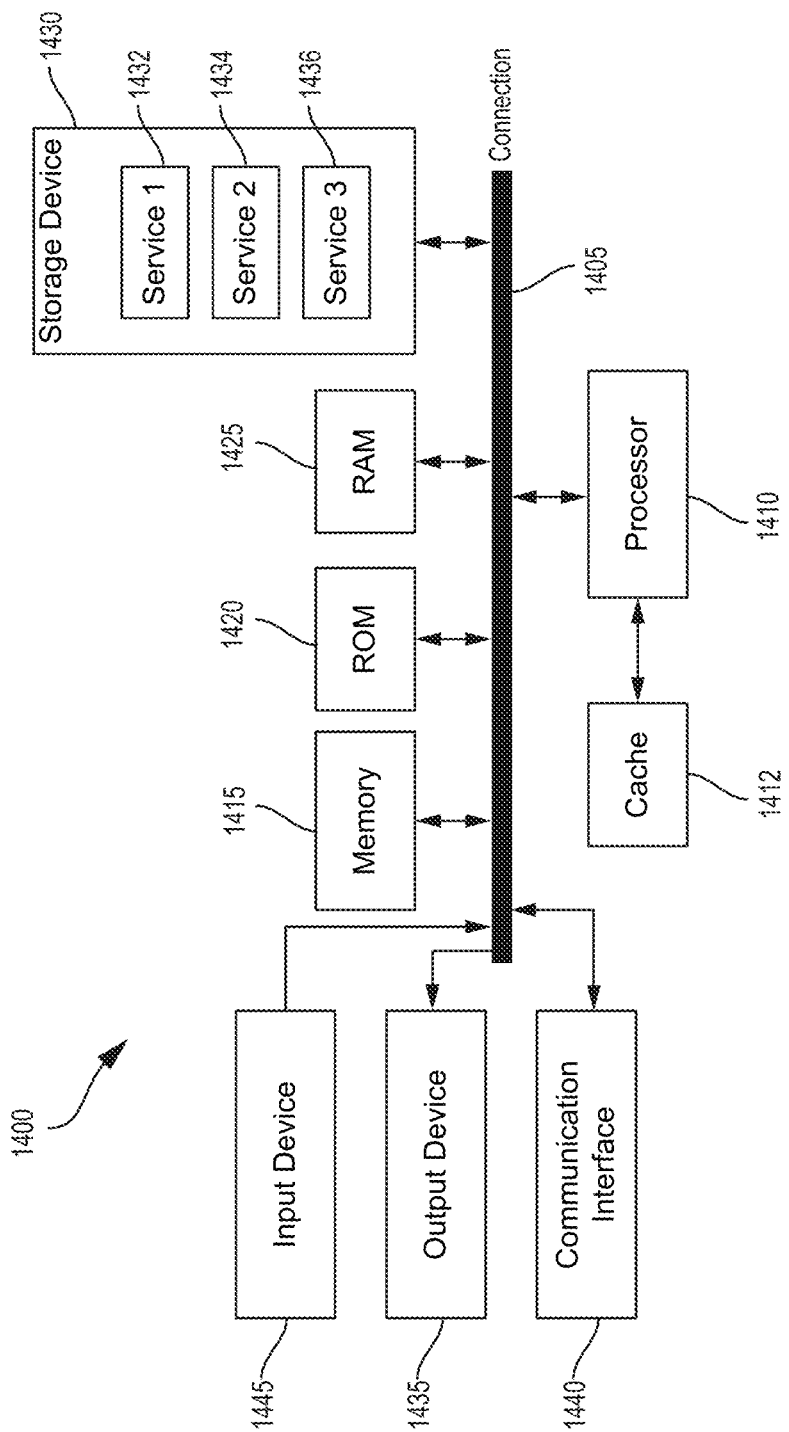
FIG. 14 is a block diagram of an exemplary computing device that may be used to implement some aspects of the technology described herein, in accordance with some examples.

FIG. 14 is a diagram illustrating an example of a system for implementing certain aspects of the present technology. In particular, FIG. 14 illustrates an example of computing system 1400, which can be for example any computing device making up internal computing system, a remote computing system, a camera, or any component thereof in which the components of the system are in communication with each other using connection 1405. Connection 1405 can be a physical connection using a bus, or a direct connection into processor 1410, such as in a chipset architecture. Connection 1405 can also be a virtual connection, networked connection, or logical connection.

In some embodiments, computing system 1400 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1400 includes at least one processing unit (CPU or processor) 1410 and connection 1405 that couples various system components including system memory 1415, such as read-only memory (ROM) 1420 and random-access memory (RAM) 1425 to processor 1410.

Computing system 1400 can include a cache 1412 of high-speed memory connected directly with, in close proximity to, or integrated as part of processor 1410.

Processor 1410 can include any general-purpose processor and a hardware service or software service, such as services 1432, 1434, and 1436 stored in storage device 1430, configured to control processor 1410 as well as a special-purpose processor where software instructions are incorporated into the actual processor design. Processor 1410 may essentially be a completely self-contained computing system, containing multiple cores or processors, a bus, memory controller, cache, etc. A multi-core processor may be symmetric or asymmetric.

To enable user interaction, computing system 1400 includes an input device 1445, which can represent any number of input mechanisms, such as a microphone for speech, a touch-sensitive screen for gesture or graphical input, keyboard, mouse, motion input, speech, etc. Computing system 1400 can also include output device 1435, which can be one or more of a number of output mechanisms. In some instances, multimodal systems can enable a user to provide multiple types of input/output to communicate with computing system 1400. Computing system 1400 can include communications interface 1440, which can generally govern and manage the user input and system output.

The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 1440 may also include one or more Global Navigation Satellite System (GNSS) receivers or transceivers that are used to determine a location of the computing system 1400 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1430 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1430 can include software services, servers, services, etc., that when the code that defines such software is executed by the processor 1410, it causes the system to perform a function. In some embodiments, a hardware service that performs a particular function can include the software component stored in a computer-readable medium in connection with the necessary hardware components, such as processor 1410, connection 1405, output device 1435, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include the following:

Aspect 1: An apparatus for performing object detection and tracking, comprising: at least one memory; and at least one processor coupled to the at least one memory, the at least one processor configured to: obtain an image comprising a target object at least partially in contact with a surface; obtain a plurality of two-dimensional (2D) keypoints based on one or more features associated with one or more portions of the target object in contact with the surface in the image; obtain information associated with a contour of the surface; and determine, based on the plurality of 2D keypoints and the information associated with the contour of the surface, a three-dimensional (3D) representation associated with the plurality of 2D keypoints.

Aspect 2: The apparatus of Aspect 1, wherein: the target object comprises a vehicle; the surface comprises a road; the information associated with the contour of the surface comprises a plane associated with the road; and the plurality of 2D keypoints comprise contact points between wheels of the vehicle and the road in the image.

Aspect 3: The apparatus of any of Aspects 1 or 2, wherein: a first 2D keypoint of the plurality of 2D keypoints comprises a first pixel position in the image, and a second 2D keypoint of the plurality of 2D keypoints comprises a second pixel position in the image; and to determine the 3D representation associated with the plurality of 2D keypoints, the at least one processor is configured to determine a 3D line segment joining a first 3D representation of the first 2D keypoint and a second 3D representation of the second 2D keypoint.

Aspect 4: The apparatus of Aspect 3, wherein the information associated with the contour of the surface comprises a plane associated with the surface and the 3D line segment is constrained to be included in the plane.

Aspect 5: The apparatus of any of Aspects 3 or 4, wherein, to determine the 3D line segment, the at least one processor is configured to determine estimated parameters of the 3D line segment.

Aspect 6: The apparatus of any of Aspects 3 to 5, wherein the estimated parameters of the 3D line segment comprise: a mid-point of the 3D line segment; a length of the 3D line segment; and an orientation of the 3D line segment.

Aspect 7: The apparatus of Aspect 6, wherein the orientation of the 3D line segment is determined based on an orientation of a lane on a road.

Aspect 8: The apparatus of any of Aspects 3 to 7, wherein, after determining the 3D line segment, the at least one processor is configured to: project the first 3D representation of the first 2D keypoint onto a first projected pixel position in the image and project the second 3D representation of the second 2D keypoint onto a second projected pixel position in the image; determine a projection error based on a first difference between the first projected pixel position and the first pixel position, a second difference between the second projected pixel position and the second pixel position, or both; and minimize the projection error by adjusting the first 3D representation of the first 2D keypoint, the second 3D representation of the second 2D keypoint, or both.

Aspect 9: The apparatus of Aspect 8 wherein, to minimize the projection error, the at least one processor is configured to determine a least squares solution for the projection error.

Aspect 10: The apparatus of Aspect 9, wherein, to determine the least squares solution, the at least one processor is configured to determine a linear least squares solution.

Aspect 11: The apparatus of Aspect 9, wherein, to determine the least squares solution, the at least one processor is configured to determine a non-linear least squares regression.

Aspect 12: The apparatus of Aspect 11, wherein an initial estimate provided for determining the non-linear least squares regression comprises a linear least squares regression.

Aspect 13: The apparatus of any of Aspects 1 or 2, wherein: a first 2D keypoint of the plurality of 2D keypoints comprises a first pixel position in the image, a second 2D keypoint of the plurality of 2D keypoints comprises a second pixel position in the image, and a third 2D keypoint of the plurality of 2D keypoints comprises a third pixel position in the image; and to determine the 3D representation associated with the plurality of 2D keypoints, the at least one processor is configured to: determine a 3D rectangle formed by a first 3D representation of the first 2D keypoint, a second 3D representation of the second 2D keypoint, and a third 3D representation of the third 2D keypoint.

Aspect 14: The apparatus of Aspect 13, wherein the information associated with the contour of the surface comprises a plane associated with the surface and the 3D rectangle is constrained to be included in the plane.

Aspect 15: The apparatus of any of Aspects 13 or 14, wherein, to determine the 3D rectangle, the at least one processor is configured to determine estimated parameters of the 3D rectangle.

Aspect 16: The apparatus of Aspect 15, wherein the estimated parameters of the 3D rectangle comprise: a mid-point of the 3D rectangle; a length of a long side of the 3D rectangle; a length of a short side of the 3D rectangle; and an orientation of the 3D rectangle.

Aspect 17: The apparatus of Aspect 16, wherein the orientation of the 3D rectangle is determined based on an orientation of a lane on a road.

Aspect 18: The apparatus of any of Aspects 13 to 17, wherein, after determining the 3D rectangle, the at least one processor is configured to: project the first 3D representation of the first 2D keypoint onto a first projected pixel position in the image, project the second 3D representation of the second 2D keypoint onto a second projected pixel position in the image, and project the third 3D representation of the third 2D keypoint onto a third projected pixel position; determine a projection error based on at least one of a first difference between the first projected pixel position and the first pixel position, a second difference between the second projected pixel position and the second pixel position, and a third difference between the third projected pixel position and the third pixel position; and minimize the projection error by adjusting at least one of the first 3D representation of the first 2D keypoint, the second 3D representation of the second 2D keypoint, and the third 3D representation of the third 2D keypoint.

Aspect 19: The apparatus of Aspect 18, wherein, to minimize the projection error, the at least one processor is configured to determine a least squares solution for the projection error.

Aspect 20: The apparatus of Aspect 19, wherein the least squares solution comprises a linear least squares solution.

Aspect 21: The apparatus of any of Aspects 19 or 20, wherein, to determine the least squares solution, the at least one processor is configured to determine a non-linear least squares regression.

Aspect 22: The apparatus of Aspect 21, wherein an initial estimate provided for determining the non-linear least squares regression comprises a linear least squares estimate.

Aspect 23: A method of performing object detection and tracking, comprising: obtaining, by a tracking object, an image comprising a target object at least partially in contact with a surface; obtaining, by the tracking object, a plurality of two-dimensional (2D) keypoints based on one or more features associated with one or more portions of the target object in contact with the surface in the image; obtaining, by the tracking object, information associated with a contour of the surface; and determining, by the tracking object based on the plurality of 2D keypoints and the information associated with the contour of the surface, a three-dimensional (3D) representation associated with the plurality of 2D keypoints.

Aspect 24: The method of Aspect 23, wherein: the target object comprises a vehicle; the surface comprises a road; the information associated with the contour of the surface comprises a plane associated with the road; and the plurality of 2D keypoints comprise contact points between wheels of the vehicle and the road in the image.

Aspect 25: The method of any of Aspects 23 or 24, wherein: a first 2D keypoint of the plurality of 2D keypoints comprises a first pixel position in the image, and a second 2D keypoint of the plurality of 2D keypoints comprises a second pixel position in the image; and determining the 3D representation associated with the plurality of 2D keypoints includes determining a 3D line segment joining a first 3D representation of the first 2D keypoint and a second 3D representation of the second 2D keypoint.

Aspect 26: The method of Aspect 25, wherein the information associated with the contour of the surface comprises a plane associated with the surface and the 3D line segment is constrained to be included in the plane.

Aspect 27: The method of Aspect 25 or 26, wherein determining the 3D line segment includes determining estimated parameters of the 3D line segment.

Aspect 28: The method of Aspect 27, wherein the estimated parameters of the 3D line segment comprise: a mid-point of the 3D line segment; a length of the 3D line segment; and an orientation of the 3D line segment.

Aspect 29: The method of Aspect 28, wherein the orientation of the 3D line segment is determined based on an orientation of a lane on a road.

Aspect 30: The method of any of Aspects 25 to 29, further comprising, after determining the 3D line segment: projecting the first 3D representation of the first 2D keypoint onto a first projected pixel position in the image and projecting the second 3D representation of the second 2D keypoint onto a second projected pixel position in the image; determining a projection error based on a first difference between the first projected pixel position and the first pixel position, a second difference between the second projected pixel position and the second pixel position, or both; and minimizing the projection error by adjusting the first 3D representation of the first 2D keypoint, the second 3D representation of the second 2D keypoint, or both.

Aspect 31: The method of Aspect 30, wherein minimizing the projection error includes determining a least squares solution for the projection error.

Aspect 32: The method of Aspect 31, wherein determining the least squares solution comprises determining a linear least squares solution.

Aspect 33: The method of any of Aspects 31 or 32, wherein determining the least squares solution comprises determining a non-linear least squares regression.

Aspect 34: The method of Aspect 33, wherein an initial estimate provided for determining the non-linear least squares regression comprises a linear least squares regression.

Aspect 35: The method of any of Aspects 23 or 24, wherein: a first 2D keypoint of the plurality of 2D keypoints comprises a first pixel position in the image, a second 2D keypoint of the plurality of 2D keypoints comprises a second pixel position in the image, and a third 2D keypoint of the plurality of 2D keypoints comprises a third pixel position in the image; and determining the 3D representation associated with the plurality of 2D keypoints includes determining a 3D rectangle formed by a first 3D representation of the first 2D keypoint, a second 3D representation of the second 2D keypoint, and a third 3D representation of the third 2D keypoint.

Aspect 36: The method of Aspect 35, wherein the information associated with the contour of the surface comprises a plane associated with the surface and the 3D rectangle is constrained to be included in the plane.

Aspect 37: The method of any of Aspects 35 or 36, wherein determining the 3D rectangle includes determining estimated parameters of the 3D rectangle.

Aspect 38: The method of Aspect 37, wherein the estimated parameters of the 3D rectangle comprise: a mid-point of the 3D rectangle; a length of a long side of the 3D rectangle; a length of a short side of the 3D rectangle; and an orientation of the 3D rectangle.

Aspect 39: The method of Aspect 38, wherein the orientation of the 3D rectangle is determined based on an orientation of a lane on a road.

Aspect 40: The method of any of Aspects 35 to 39, further comprising, after determining the 3D rectangle: projecting the first 3D representation of the first 2D keypoint onto a first projected pixel position in the image, projecting the second 3D representation of the second 2D keypoint onto a second projected pixel position in the image, and projecting the third 3D representation of the third 2D keypoint onto a third projected pixel position; determining a projection error based on at least one of a first difference between the first projected pixel position and the first pixel position, a second difference between the second projected pixel position and the second pixel position, and a third difference between the third projected pixel position and the third pixel position; and minimizing the projection error by adjusting at least one of the first 3D representation of the first 2D keypoint, the second 3D representation of the second 2D keypoint, and the third 3D representation of the third 2D keypoint.

Aspect 41: The method of Aspect 40, wherein minimizing the projection error includes determining a least squares solution for the projection error.

Aspect 42: The method of Aspect 41, wherein the least squares solution comprises determining a linear least squares solution.

Aspect 43: The method of any of Aspects 41 or 42, wherein determining the least squares solution includes determining a non-linear least squares regression.

Aspect 44: The method of Aspect 43, wherein an initial estimate provided for determining the non-linear least squares regression comprises a linear least squares estimate.

Aspect 45: A non-transitory computer-readable storage medium having stored thereon instructions which, when executed by one or more processors, cause the one or more processors to perform any of the operations of Aspects 1 to 44.

Aspect 46: An apparatus comprising means for performing any of the operations of Aspects 1 to 44.

What is claimed is:

1. An apparatus for performing object detection and tracking, comprising:
   at least one memory; and
   at least one processor coupled to the at least one memory, the at least one processor configured to:
   obtain an image comprising a target object at least partially in contact with a surface;
   obtain a plurality of two-dimensional (2D) keypoints based on one or more features associated with one or more portions of the target object in contact with the surface in the image;
   obtain information associated with a contour of the surface; and
   determine, based on the plurality of 2D keypoints and the information associated with the contour of the surface, a three-dimensional (3D) representation associated with the plurality of 2D keypoints.

2. The apparatus of claim 1, wherein:
   the target object comprises a vehicle;
   the surface comprises a road;
   the information associated with the contour of the surface comprises a plane associated with the road; and
   the plurality of 2D keypoints comprise contact points between wheels of the vehicle and the road in the image.

3. The apparatus of claim 1, wherein:
   a first 2D keypoint of the plurality of 2D keypoints comprises a first pixel position in the image, and a second 2D keypoint of the plurality of 2D keypoints comprises a second pixel position in the image; and
   to determine the 3D representation associated with the plurality of 2D keypoints, the at least one processor is configured to determine a 3D line segment joining a first 3D representation of the first 2D keypoint and a second 3D representation of the second 2D keypoint.

4. The apparatus of claim 3, wherein the information associated with the contour of the surface comprises a plane associated with the surface and the 3D line segment is constrained to be included in the plane.

5. The apparatus of claim 3, wherein, to determine the 3D line segment, the at least one processor is configured to determine estimated parameters of the 3D line segment.

6. The apparatus of claim 5, wherein the estimated parameters of the 3D line segment comprise:
   a mid-point of the 3D line segment;
   a length of the 3D line segment; and
   an orientation of the 3D line segment.

7. The apparatus of claim 6, wherein the orientation of the 3D line segment is determined based on an orientation of a lane on a road.

8. The apparatus of claim 3, wherein, after determining the 3D line segment, the at least one processor is configured to:
   project the first 3D representation of the first 2D keypoint onto a first projected pixel position in the image and project the second 3D representation of the second 2D keypoint onto a second projected pixel position in the image;
   determine a projection error based on a first difference between the first projected pixel position and the first pixel position, a second difference between the second projected pixel position and the second pixel position, or both; and
   minimize the projection error by adjusting the first 3D representation of the first 2D keypoint, the second 3D representation of the second 2D keypoint, or both.

9. The apparatus of claim 8, wherein, to minimize the projection error, the at least one processor is configured to determine a least squares solution for the projection error.

10. The apparatus of claim 1, wherein:
    a first 2D keypoint of the plurality of 2D keypoints comprises a first pixel position in the image, a second 2D keypoint of the plurality of 2D keypoints comprises a second pixel position in the image, and a third 2D keypoint of the plurality of 2D keypoints comprises a third pixel position in the image; and to determine the 3D representation associated with the plurality of 2D keypoints, the at least one processor is configured to:
  determine a 3D rectangle formed by a first 3D representation of the first 2D keypoint, a second 3D representation of the second 2D keypoint, and a third 3D representation of the third 2D keypoint.

11. The apparatus of claim 10, wherein the information associated with the contour of the surface comprises a plane associated with the surface and the 3D rectangle is constrained to be included in the plane.

12. The apparatus of claim 10, wherein, to determine the 3D rectangle, the at least one processor is configured to determine estimated parameters of the 3D rectangle.

13. The apparatus of claim 12, wherein the estimated parameters of the 3D rectangle comprise:
  a mid-point of the 3D rectangle;
  a length of a long side of the 3D rectangle;
  a length of a short side of the 3D rectangle; and
  an orientation of the 3D rectangle.

14. The apparatus of claim 13, wherein the orientation of the 3D rectangle is determined based on an orientation of a lane on a road.

15. The apparatus of claim 10, wherein, after determining the 3D rectangle, the at least one processor is configured to:
  project the first 3D representation of the first 2D keypoint onto a first projected pixel position in the image, project the second 3D representation of the second 2D keypoint onto a second projected pixel position in the image, and project the third 3D representation of the third 2D keypoint onto a third projected pixel position;
  determine a projection error based on at least one of a first difference between the first projected pixel position and the first pixel position, a second difference between the second projected pixel position and the second pixel position, and a third difference between the third projected pixel position and the third pixel position; and
  minimize the projection error by adjusting at least one of the first 3D representation of the first 2D keypoint, the second 3D representation of the second 2D keypoint, and the third 3D representation of the third 2D keypoint.

16. The apparatus of claim 15, wherein, to minimize the projection error, the at least one processor is configured to determine a least squares solution for the projection error.

17. The apparatus of claim 16, wherein the least squares solution comprises determining a linear least squares solution.

18. A method of performing object detection and tracking, comprising:
  obtaining, by a tracking object, an image comprising a target object at least partially in contact with a surface;
  obtaining, by the tracking object, a plurality of two-dimensional (2D) keypoints based on one or more features associated with one or more portions of the target object in contact with the surface in the image;
  obtaining, by the tracking object, information associated with a contour of the surface; and
  determining, by the tracking object based on the plurality of 2D keypoints and the information associated with the contour of the surface, a three-dimensional (3D) representation associated with the plurality of 2D keypoints.

19. The method of claim 18, wherein:
  the target object comprises a vehicle;
  the surface comprises a road;
  the information associated with the contour of the surface comprises a plane associated with the road; and
  the plurality of 2D keypoints comprise contact points between wheels of the vehicle and the road in the image.

20. The method of claim 18, wherein:
  a first 2D keypoint of the plurality of 2D keypoints comprises a first pixel position in the image, and a second 2D keypoint of the plurality of 2D keypoints comprises a second pixel position in the image; and
  determining the 3D representation associated with the plurality of 2D keypoints includes determining a 3D line segment joining a first 3D representation of the first 2D keypoint and a second 3D representation of the second 2D keypoint.

21. The method of claim 20, wherein the information associated with the contour of the surface comprises a plane associated with the surface and the 3D line segment is constrained to be included in the plane.

22. The method of claim 20, wherein determining the 3D line segment includes determining estimated parameters of the 3D line segment.

23. The method of claim 20, further comprising, after determining the 3D line segment:
  projecting the first 3D representation of the first 2D keypoint onto a first projected pixel position in the image and projecting the second 3D representation of the second 2D keypoint onto a second projected pixel position in the image;
  determining a projection error based on a first difference between the first projected pixel position and the first pixel position, a second difference between the second projected pixel position and the second pixel position, or both; and
  minimizing the projection error by adjusting the first 3D representation of the first 2D keypoint, the second 3D representation of the second 2D keypoint, or both.

24. The method of claim 23, wherein minimizing the projection error includes determining a least squares solution for the projection error.

25. The method of claim 18, wherein:
  a first 2D keypoint of the plurality of 2D keypoints comprises a first pixel position in the image, a second 2D keypoint of the plurality of 2D keypoints comprises a second pixel position in the image, and a third 2D keypoint of the plurality of 2D keypoints comprises a third pixel position in the image; and
  determining the 3D representation associated with the plurality of 2D keypoints includes determining a 3D rectangle formed by a first 3D representation of the first 2D keypoint, a second 3D representation of the second 2D keypoint, and a third 3D representation of the third 2D keypoint.

26. The method of claim 25, wherein determining the 3D rectangle includes determining estimated parameters of the 3D rectangle.

27. The method of claim 26, wherein the estimated parameters of the 3D rectangle comprise:
  a mid-point of the 3D rectangle;
  a length of a long side of the 3D rectangle;
  a length of a short side of the 3D rectangle; and
  an orientation of the 3D rectangle.

28. The method of claim 27, wherein the orientation of the 3D rectangle is determined based on an orientation of a lane on a road.

29. The method of claim 25, further comprising, after determining the 3D rectangle:
- projecting the first 3D representation of the first 2D keypoint onto a first projected pixel position in the image, projecting the second 3D representation of the second 2D keypoint onto a second projected pixel position in the image, and projecting the third 3D representation of the third 2D keypoint onto a third projected pixel position;
- determining a projection error based on at least one of a first difference between the first projected pixel position and the first pixel position, a second difference between the second projected pixel position and the second pixel position, and a third difference between the third projected pixel position and the third pixel position; and
- minimizing the projection error by adjusting at least one of the first 3D representation of the first 2D keypoint, the second 3D representation of the second 2D keypoint, and the third 3D representation of the third 2D keypoint.

30. The method of claim 29, wherein minimizing the projection error includes determining a least squares solution for the projection error.

* * * * *